(12) United States Patent
Motosugi et al.

(10) Patent No.: US 7,749,132 B2
(45) Date of Patent: Jul. 6, 2010

(54) CLUTCH ENGAGEMENT CONTROL APPARATUS FOR HYBRID VEHICLE

(75) Inventors: Jun Motosugi, Sagamihara (JP); Ken Ito, Machida (JP); Kazutaka Adachi, Yokohama (JP); Hiroyuki Ashizawa, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 653 days.

(21) Appl. No.: 11/753,321

(22) Filed: May 24, 2007

(65) Prior Publication Data
US 2007/0275823 A1    Nov. 29, 2007

(30) Foreign Application Priority Data
May 26, 2006  (JP)  ............................ 2006-146776

(51) Int. Cl.
*B60W 10/02*  (2006.01)
*B60W 10/04*  (2006.01)
(52) U.S. Cl. .............................. 477/5; 477/176; 477/181
(58) Field of Classification Search .................. 477/176, 477/180, 181
See application file for complete search history.

(56) References Cited

U.S. PATENT DOCUMENTS

| 6,733,299 B2* | 5/2004 | Eguchi et al. ............... 477/176 |
| 7,037,239 B2* | 5/2006 | Werner et al. ............... 477/176 |
| 7,226,383 B2* | 6/2007 | Namba ......................... 477/5 |
| 2003/0125162 A1* | 7/2003 | Senger et al. ............... 477/181 |
| 2004/0166992 A1* | 8/2004 | Buchanan et al. ........... 477/181 |
| 2008/0254942 A1* | 10/2008 | Minami ...................... 477/176 |
| 2009/0055060 A1* | 2/2009 | Minami ....................... 701/54 |

FOREIGN PATENT DOCUMENTS

| JP | H11-082260 | 3/1999 |
| JP | 2004-203219 | 7/2004 |

* cited by examiner

*Primary Examiner*—Sherry Estremsky
(74) *Attorney, Agent, or Firm*—Young Basile

(57) ABSTRACT

A clutch control apparatus is provided for a hybrid vehicle having at least two different power sources and a clutch disposed between the power sources and the drive wheels arranged to vary a transmission torque capacity. A separate clutch input and output speed sensing device senses the actual clutch input and output speeds respectively. A controller is configured to calculate a target vehicle driving torque according to a driver's operation and the vehicle running condition.

21 Claims, 15 Drawing Sheets

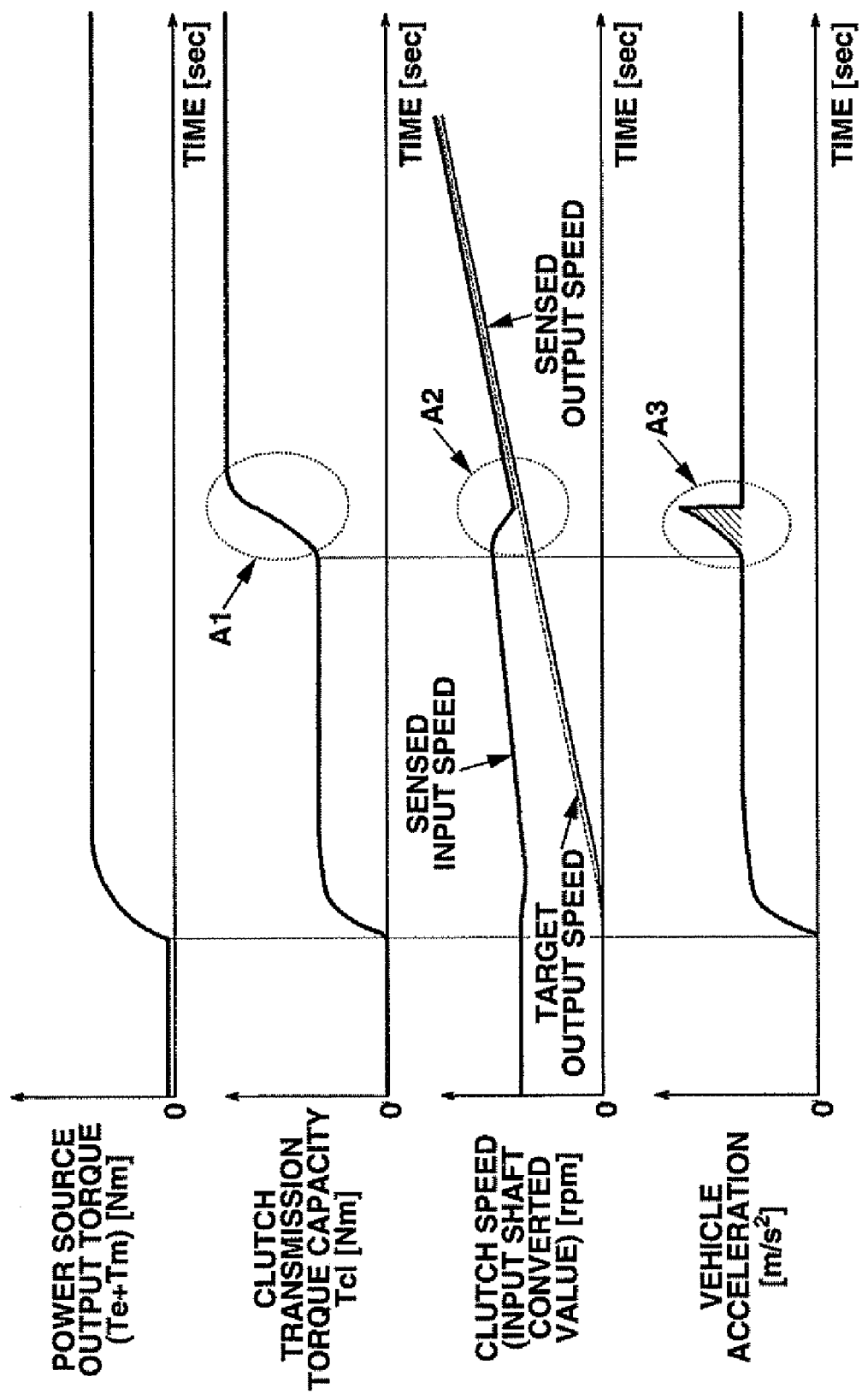

CLUTCH ENGAGEMENT CONTROL APPARATUS FOR HYBRID VEHICLE

CROSS-REFERENCE TO RELATED APPLICATION

This application claims priority to Japanese Patent Application No. 2006-146776, filed on May 26, 2006, which is incorporated herein in its entirety by reference.

FIELD OF THE INVENTION

The invention relates in general to techniques for controlling a clutch of a hybrid vehicle for transmitting driving power from the power sources to a drive axle.

BACKGROUND

Japanese patent document JP H11-082260 A discloses a hybrid drive system for a hybrid vehicle. That hybrid drive system includes a motor-generator connected with a shaft between an engine and a transmission, a first clutch disposed between the engine and the motor-generator and a second clutch between the motor-generator and the transmission in place of a torque converter.

This hybrid drive system can drive the vehicle in an electric drive (EV) mode with the power only from the motor-generator by disengaging the first clutch and engaging the second clutch, and in a hybrid drive (HEV) mode with power from both the engine and motor-generator by engaging the first and second clutches.

The hybrid drive system can control the first and second clutches by using a clutch control technique such as that disclosed in Japanese Patent document JP 2004-203219 A. The clutch control system of this clutch control technique is arranged to control the engagement of the clutch by supplying an oil pressure to the clutch so as to achieve the transmission torque capacity capable of transmitting the torque generated by the power sources.

SUMMARY

Embodiments of a clutch engagement control apparatus for a hybrid vehicle are taught herein. One example of a clutch engagement control apparatus comprises power sources, a clutch disposed between power sources and drive wheels and arranged to vary a transmission torque capacity, a clutch input speed sensing device to sense an actual clutch input speed of an input side of the clutch, a clutch output speed sensing device to sense an actual clutch output speed of an output side of the clutch and a controller. The controller is configured to calculate a target vehicle driving torque in accordance with a driver's operation and a vehicle running condition, calculate a target clutch slip speed of the clutch in accordance with a vehicle running condition, calculate a target clutch input speed of the input side of the clutch and a target clutch output speed of the output side of the clutch in accordance with the target vehicle driving torque and the target clutch slip speed, calculate a target power source output torque of the power sources to reduce a clutch input speed deviation between the target clutch input speed and the actual clutch input speed, calculate a target clutch transmission torque capacity of the clutch to reduce a clutch output speed deviation between the target clutch output speed and the actual clutch output speed, control the power sources so as to control an actual power source output torque of the power sources toward the target power source output torque and control the clutch so as to control an actual clutch transmission torque capacity of the clutch toward the target clutch transmission torque capacity.

Other embodiments of a clutch engagement control apparatus for a hybrid vehicle are taught herein. The hybrid vehicle can include power sources, a drive wheel and a clutch disposed between power sources and a drive wheel. The clutch is arranged to vary a transmission torque capacity, and the apparatus comprises means for calculating a target vehicle driving torque in accordance with a driver's operation and a vehicle running condition, means for calculating a target clutch slip speed of the clutch in accordance with a vehicle running condition, means for calculating a target clutch input speed of an input side of the clutch and a target clutch output speed of an output side of the clutch in accordance with the target vehicle driving torque and the target clutch slip speed, means for calculating a target power source output torque of the power sources to reduce a clutch input speed deviation between the target clutch input speed and an actual clutch input speed of the clutch, means for calculating a target clutch transmission torque capacity of the clutch to reduce a clutch output speed deviation between the target clutch output speed and an actual clutch output speed of the clutch, means for controlling the power sources so as to control an actual power source output torque of the power sources toward the target power source output torque and means for controlling the clutch so as to control an actual clutch transmission torque capacity of the clutch toward the target clutch transmission torque capacity.

Methods for controlling clutch engagement of such a hybrid vehicle are also taught herein. One such method comprises calculating a target vehicle driving torque in accordance with a driver's operation and a vehicle running condition, calculating a target clutch slip speed of the clutch in accordance with a vehicle running condition, calculating a target clutch input speed of an input side of the clutch and a target clutch output speed of an output side of the clutch in accordance with the target vehicle driving torque and the target clutch slip speed, calculating a target power source output torque of the power sources to reduce a clutch input speed deviation between the target clutch input speed and an actual clutch input speed of the input side of the clutch, calculating a target clutch transmission torque capacity of the clutch to reduce a clutch output speed deviation between the target clutch output speed and an actual clutch output speed of the output side of the clutch, controlling the power sources so as to control an actual power source output torque of the power sources toward the target power source output torque and controlling the clutch so as to control an actual clutch transmission torque capacity of the clutch toward the target clutch transmission torque capacity.

BRIEF DESCRIPTION OF THE DRAWINGS

The description herein makes reference to the accompanying drawings wherein like reference numerals refer to like parts throughout the several views, and wherein:

FIG. 15 is a time chart illustrating another error appearing even if a problem in the clutch engagement control of FIG. 14 is solved by another comparative example.

DETAILED DESCRIPTION OF EMBODIMENTS OF THE INVENTION

In the clutch control technique disclosed in Japanese Patent document JP 2004-203219A, the control system controls the clutch oil pressure in the manner of feedforward control. Therefore, when a disturbance is produced by a change with time in the clutch operating characteristic or a change in the road gradient, the control system holds the command of the clutch pressure unchanged, so that the clutch output speed is influenced by the disturbance.

In contrast, herein it is recognized that the cause of this problem is that the clutch engagement control disregards the clutch output speed. Accordingly, embodiments of a clutch engagement control apparatus for a hybrid vehicle described herein determine a target transmission torque capacity of a clutch in consideration of the clutch output speed and control engagement of the clutch so as to achieve this target. The control apparatus controls the transmission torque capacity of the clutch in a feedback control manner to reduce the clutch output speed duration between the target clutch output speed and the sensed actual clutch output speed.

In addition, embodiments of the clutch engagement control apparatus are capable of reducing the effects of an unpleasant acceleration change by causing the clutch input speed to vary without being influenced even when there arises a variation in the output torque characteristic of the power sources on the input side of the clutch or an abrupt change in the clutch transmission torque capacity.

Figure 1:
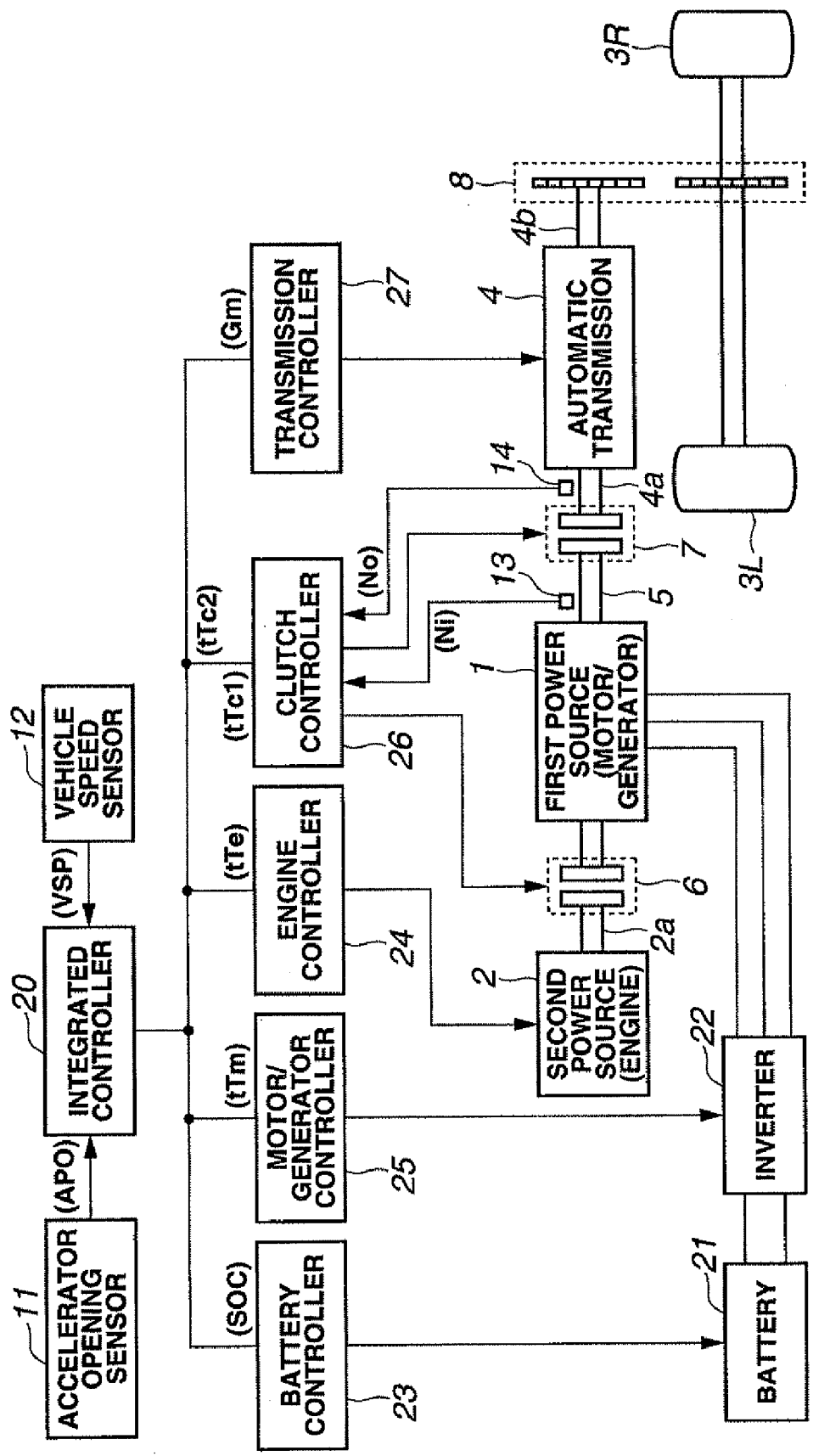
FIG. 1 is a schematic view of a hybrid vehicle equipped with a clutch control apparatus according to one embodiment of the invention, inclusive of a hybrid power train and a controlling system.

FIG. 1 illustrates a hybrid vehicle provided with a clutch engagement control apparatus or system according to one embodiment of the invention. As shown in FIG. 1, the hybrid vehicle includes a drive system (power train) and a controlling system for controlling the drive system. The vehicle includes a motor-generator 1 as a first power source, an engine 2 as a second power source and left and right drive wheels (left and right rear wheels) 3L and 3R.

In the power train of the hybrid vehicle shown in FIG. 1, like an ordinary rear wheel drive vehicle, an automatic transmission 4 is disposed in tandem on the rear side of engine 2 in the longitudinal direction of the vehicle. Motor-generator 1 is connected with a shaft 5 for transmitting rotation from engine 2 (a crankshaft 2a) to an input shaft 4a of an automatic transmission 4.

Motor-generator 1 of this example is an alternating-current synchronous motor that functions as a motor in an operation of driving wheels 3L and 3R and functions as a generator in an operation of braking wheels 3L and 3R regeneratively. Motor-generator 1 is disposed between the engine 2 and the automatic transmission 4. First clutch 6 is interposed between the motor-generator 1 and the engine 2, more specifically between the shaft 5 and the engine crankshaft 2a. First clutch 6 is arranged to connect the engine 2 and the motor-generator 1 and to disconnect the engine 2 and the motor-generator 1 from each other. First clutch 6 of this example is a dry clutch capable of varying a transmission torque capacity continuously or stepwise. For example, first clutch 6 is of a type including an electromagnetic solenoid with which the clutch engagement force can be controlled continuously to vary the transmission torque capacity.

A second clutch 7 is interposed between the motor-generator 1 and the automatic transmission 4, more specifically between the shaft 5 and the transmission input shaft 4a. Second clutch 7 is arranged to connect the motor-generator 1 and the automatic transmission 4 and to disconnect the motor-generator 1 and the automatic transmission 4 from each other. Second clutch 7 is a clutch capable of varying a transmission torque capacity continuously or stepwise similar to the first clutch 6. Second clutch 7 of this example is of a wet multiple-plate clutch that can vary the clutch transmission torque capacity by controlling a clutch operating fluid (oil) flow rate and a clutch operation fluid (oil) pressure continuously with a proportional solenoid.

As automatic transmission 4, this example employs an automatic transmission disclosed in "Skyline new model (CV35) manual" published by NISSAN motor Co., Ltd. January 2003, pages C-9~C-22. This automatic transmission determines a torque transmission path (shift speed) by selectively engaging and releasing a plurality of friction elements (clutches and brakes) to determine a desired combination of the engaged/released states of the friction elements. Thus, automatic transmission 4 receives input rotation from the input shaft 4a, and delivers output rotation from an output shaft 4b at a speed determined by a gear ratio corresponding to the selected speed. This output rotation is transmitted by a final reduction unit 8 including a differential gear to left and right rear wheels 3L and 3R to drive the vehicle. However, as automatic transmission 4, it is possible to employ a conventional continuously variable transmission (CVT) instead of a multi-speed automatic transmission.

When an electric drive (EV) mode is required in a low load, low speed region (including a starting operation of starting the vehicle from the rest state), the first clutch 6 is disengaged, the second clutch 7 is engaged, and the automatic transmission 4 is put in a power transmitting state. In this state, the automatic transmission 4 receives only the output rotation of motor-generator 1 and delivers transmission output rotation at a selected speed from output shaft 4b. The drive system transmits the output rotation of automatic transmission 4 through final reduction unit 8 to the left and right rear wheels 3L and 3R and drives the vehicle only with the power from the motor-generator 1 in the electric drive or EV mode.

When there is a request for a hybrid drive mode or HEV mode used in a high speed running operation, a heavy load running operation or in a situation in which the battery has only a small amount of available electric power which can be taken out, the first and second clutches 6 and 7 are both engaged, and the automatic transmission 4 is put in the power transmitting state. In this state, automatic transmission 4 receives the output rotation of the engine 2, or both of the output rotations of the engine 2 and the motor-generator 1 and delivers the transmission output rotation at a selected speed from output shaft 4b. The drive system transmits the output rotation of automatic transmission 4 through final reduction unit 8 to left and right rear wheels 3L and 3R, and the drive system can drive the vehicle with both power from the engine 2 and power from the motor-generator 1 in the hybrid drive or HEV mode.

When engine 2 is operated at an optimum fuel consumption in the HEV mode, and there is produced surplus energy, this drive system can improve the fuel consumption of engine 2 by converting this surplus energy into electric power by operating the motor-generator 1 in the generator mode with the surplus energy. The generated electric power is stored for later use for driving motor-generator 1.

In the drive system shown in FIG. 1, the second clutch 7 disconnectably connects the motor-generator 1 and drive wheels 3L and 3R between the motor-generator 1 and the automatic transmission 4 (i.e., connects them in a manner capable of disconnecting them from each other). However, it is optional to dispose the second clutch 7 between the automatic transmission 4 and final reduction unit 8. Second clutch 7 can also be one or more of the friction elements provided in automatic transmission 4 for selecting the desired speed.

The vehicle shown in FIG. 1 further includes the controlling system for the engine 2, the motor-generator 1, the first clutch 6, the second clutch 7 and the automatic transmission 4 in the power train of the hybrid vehicle. The controlling system of FIG. 1 includes an integrated controller 20 for controlling an operating point of the power train in an integrated or consolidated manner. An integrated controller 20 determines the operating point of the power train with a target engine torque tTe, a target motor-generator torque tTm (or a target motor-generator rotational speed tNm), a target transmission torque capacity tTc1 of the first clutch 6, a target transmission torque capacity tTc2 of the second clutch 7 and a target gear position (gear ratio or speed ratio) Gm of the automatic transmission 4.

In order to determine the operating point of the power train, integrated controller 20 receives a signal from an accelerator opening sensor 11 for sensing an accelerator opening (or opening degree) of the vehicle accelerator and a signal from a vehicle speed sensor 12 for sensing a vehicle speed VSP of the vehicle.

A battery 21 supplies electric power through an inverter 22 to drive the motor-generator 1. When the motor-generator 1 is operated as a generator, the power generated by motor-generator 1 is stored into battery 21. To protect the battery 21 from being overcharged, a battery controller 23 controls the charging and discharging condition of the battery 21. Therefore, the battery controller 23 senses a state of charge SOC of the battery 21 (i.e., an amount of available power), and supplies information on the state of charge of battery 21 to the integrated controller 20.

In accordance with the accelerator opening APO, the battery state of charge SOC and the vehicle speed VSP, the integrated controller 20 selects the operating mode (among the EV mode and HEV mode) that can achieve the vehicle driving force requested by the driver. Integrated controller 20 then calculates target engine torque tTe, target motor-generator torque tTm, target first clutch transmission torque capacity tTc1, target second clutch transmission torque capacity tTc2 and target gear position Gm. Power source output torque control is then performed by engine controller 24 by delivering target engine torque tTe and target motor-generator torque tTm to the engine controller 24.

Engine controller 24 controls the engine 2 so as to make an actual engine torque Te equal to target engine torque tTe. Motor-generator controller 25 the controls motor-generator 1 through the inverter 22 with power from the battery 21 so as to make an actual motor-generator torque Tm equal to target motor-generator torque tTm.

Integrated controller 20 delivers the target first clutch transmission torque capacity tTc1 and target second clutch transmission torque capacity tTc2 to a clutch controller 26, which corresponds to a clutch transmission torque capacity controlling section. Clutch controller 26 supplies a solenoid current corresponding to target first clutch transmission torque capacity tTc1 to an electromagnetic force control solenoid of the first clutch 6. Thereby, clutch controller 26 controls engagement of the first clutch 6 so as to make an actual first clutch transmission torque capacity Tc1 equal to the target first clutch transmission torque capacity tTc1. Moreover, clutch controller 26 supplies a solenoid current corresponding to target second clutch transmission torque capacity tTc2 to a fluid pressure control solenoid of second clutch 7. Thereby, and clutch controller 26 controls engagement of second clutch 7 so as to make an actual second clutch transmission torque capacity Tc2 equal to the target second clutch transmission torque capacity tTc2.

A transmission controller 27 receive the target gear position Gm determined by integrated controller 20 and controls the automatic transmission 4 to select the target gear position (target gear ratio) Gm.

In this embodiment, integrated controller 20 controls the second clutch 7 through the clutch controller 26 in a manner next described. First, signals from a clutch input (side) speed sensor 13 and a clutch output (side) speed sensor 14 are supplied through clutch controller 26 to integrated controller 20. In this example, clutch input speed sensor 13 is arranged to sense the rotational speed of motor-generator 1 as an actual clutch output side speed Ni of second clutch 7. Clutch output speed sensor 14 is arranged to sense the rotational speed of input shaft 4a of automatic transmission 4 as an actual clutch output side speed No.

Each controller described herein, including the integrated controller 20, generally consists of a microcomputer including central processing unit (CPU), input and output ports (I/O) receiving certain data described herein, random access memory (RAM), keep alive memory (KAM), a common data bus and read only memory (ROM) as an electronic storage medium for executable programs and certain stored values as discussed herein. The functional (or processing) sections of the integrated controller 20 described herein could be, for example, implemented in software as the executable programs, or could be implemented in whole or in part by separate hardware in the form of one or more integrated circuits (IC). Also, although each of the controllers is shown as a separate device, the controllers can be implemented by fewer devices, including a common device.

Figure 2:
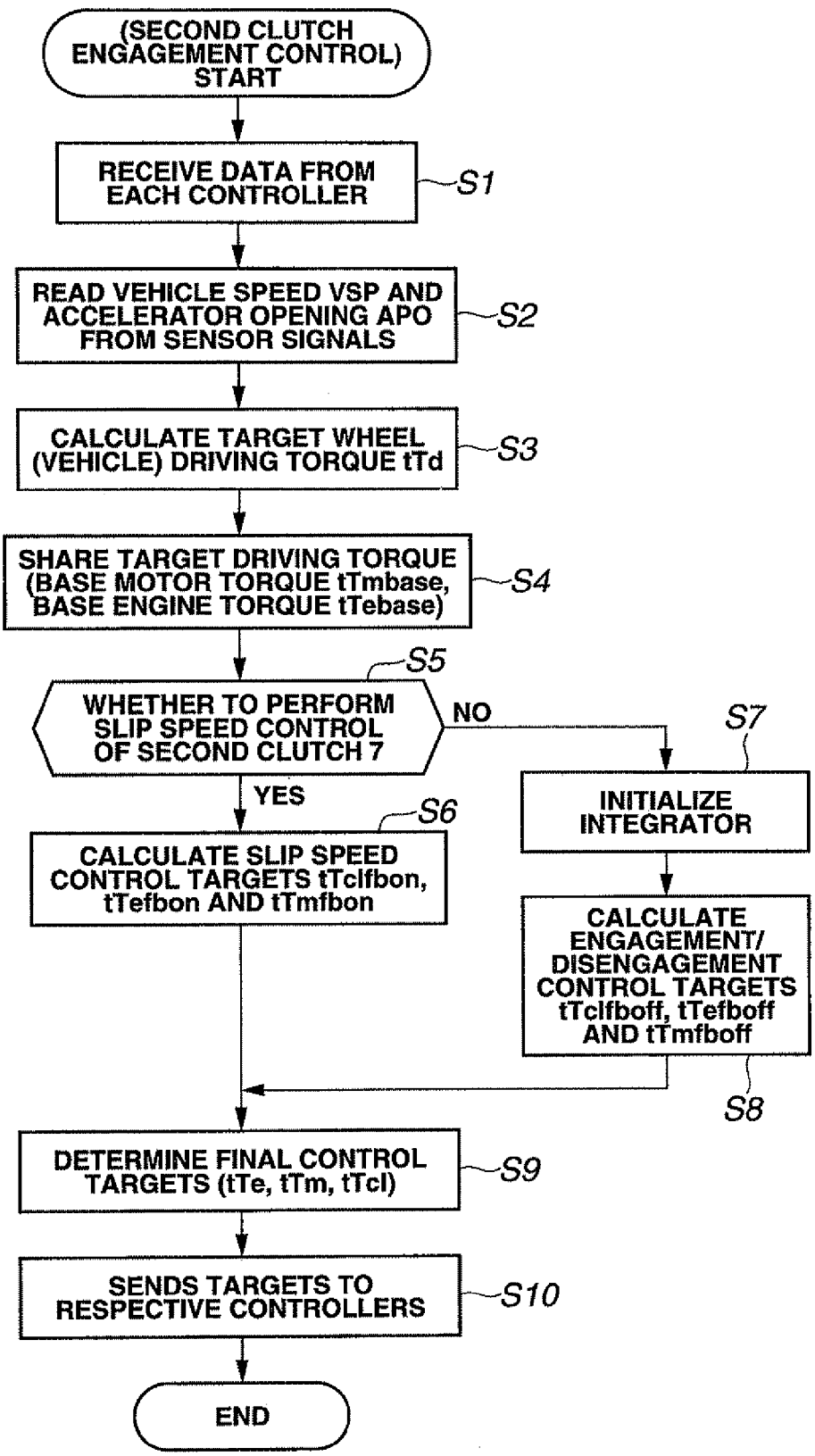
FIG. 2 is a flowchart of a clutch engagement control program performed by an integrated controller shown in FIG. 1.
Figure 3:
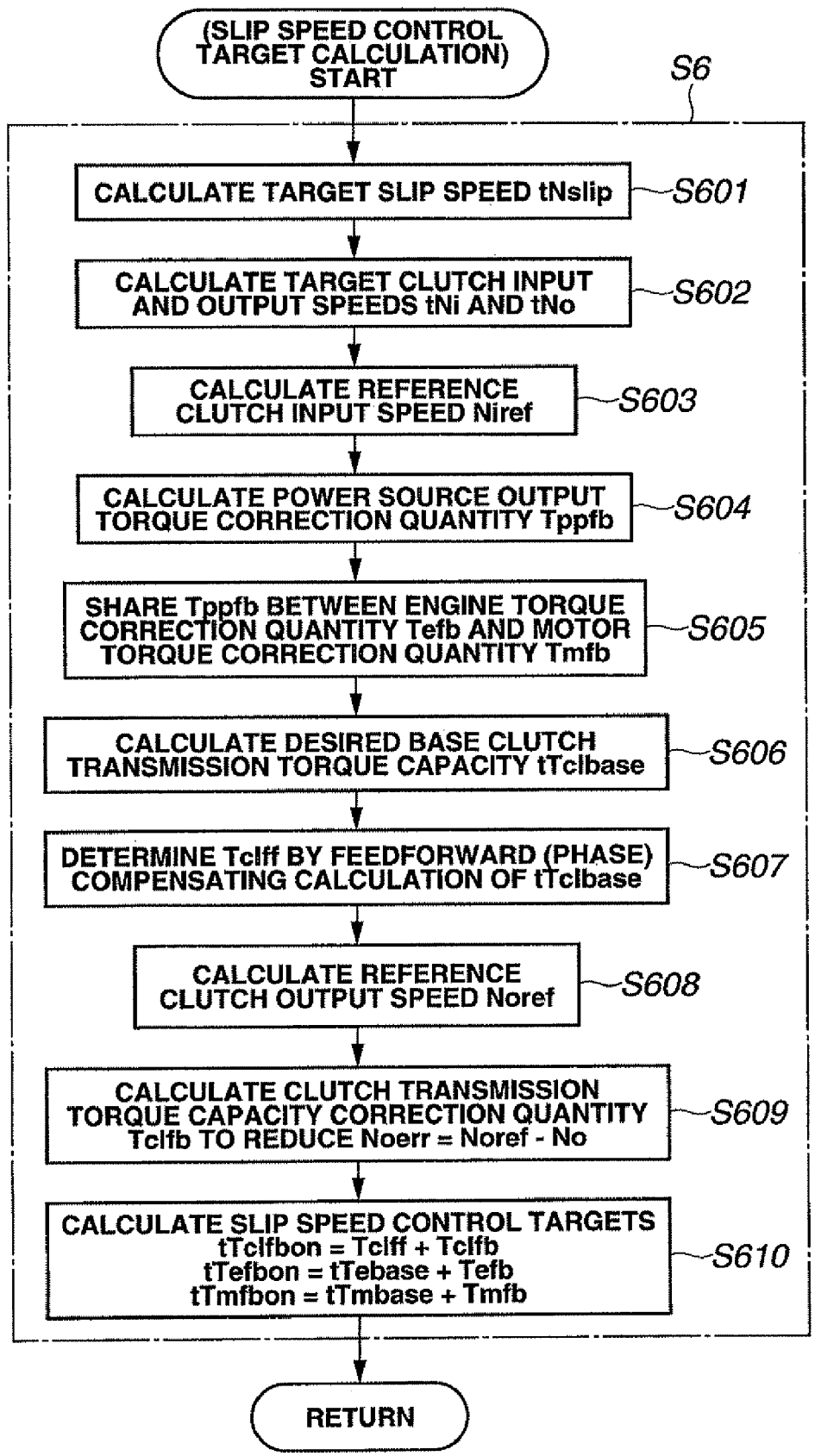
FIG. 3 is a flowchart of a calculation program calculating clutch slip control target quantities in the clutch engagement control program of FIG. 2.

More specifically, integrated controller 20 controls engagement of the second clutch 7 by performing a control program shown in FIGS. 2 and 3. The control program of FIG. 2 is a main routine executed repeatedly at regular time intervals by timer interrupt. First, at step S1 the integrated controller 20 receives data from the other controllers 23-27 and reads the state of charge SOC of the battery 21, the actual input and output speeds Ni and No of the second clutch 7 and the selected gear position (selected gear ratio) Gm of the automatic transmission 4. In this example, it is assumed that the selected gear position is the same as the above-mentioned target gear position.

Figure 4:
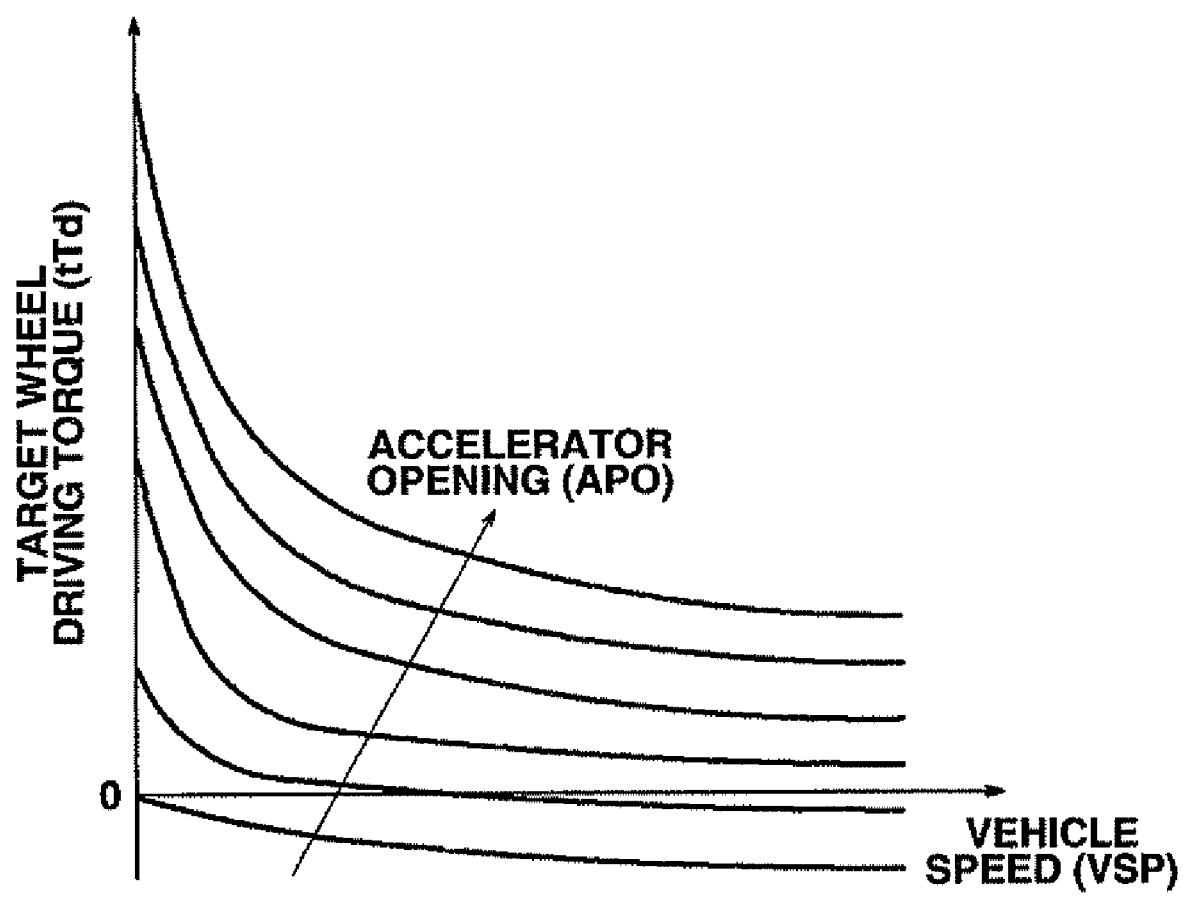
FIG. 4 is a graph used for determining a target wheel driving torque in the clutch engagement control program of FIG. 2.

At step S2 integrated controller 20 reads accelerator opening APO and vehicle speed VSP based on signals from the sensors 11 and 12. At a next step S3, integrated controller 20 calculates a target wheel driving torque tTd in accordance with vehicle speed VSP and accelerator opening APO by look-up using a predetermined driving force map such as that shown in FIG. 4. Then, at step S4 integrated controller 20 determines a desired base motor torque tTmbase and a desired base engine torque tTebase that controls how the target wheel driving torque tTd is shared between the motor-generator 1 and the engine 2. It is possible to employ one of various sharing methods for sharing target wheel driving torque tTd. Detailed explanation is omitted since various sharing methods are known in the art.

At step S5 integrated controller 20 checks whether or not to perform a slip speed control (or engagement control) of the second clutch 7. In this example, integrated controller 20 compares a slip quantity of second clutch 7 (that is, a rotational speed difference between the actual clutch input speed Ni and the actual clutch output speed No of second clutch 7) with a predetermined slip quantity value. Integrated controller 20 decides to perform the slip speed (engagement) control of second clutch 7 ("YES" at step S5), when the slip quantity of second clutch 7 is greater than or equal to the predetermined slip quantity value. Integrated controller 20 decides not to perform the slip speed (engagement) control of second clutch 7 when the slip quantity of the second clutch 7 is smaller than the predetermined slip quantity value ("NO at step S5).

When the response to decision step S5 is to perform the clutch slip speed control, integrated controller 20 proceeds to step S6. At step S6 integrated controller 20 calculates a target slip speed control quantity (a target clutch transmission torque capacity tTclfbon, a target engine output torque tTefbon and a target motor output torque tTmfbon) according to the control program shown in FIG. 3.

At step S601 of FIG. 3, integrated controller 20 calculates a target slip rotational speed tNslip from a desired base slip rotational speed tNslipbase (normally set equal to 0) according to the following recurrence equation obtained by discretization (or digitization) with Tustin approximation:

$$tNslip = Gslip(s) \cdot tNslipbase = \{1/(\tau_{slip} \cdot s + 1)\} tNslipbase; \text{ wherein} \quad (1)$$

Gslip is a filter for the target slip speed calculation; and $\tau_{slip}$ is a time constant for the target slip speed calculation.

Figure 5:
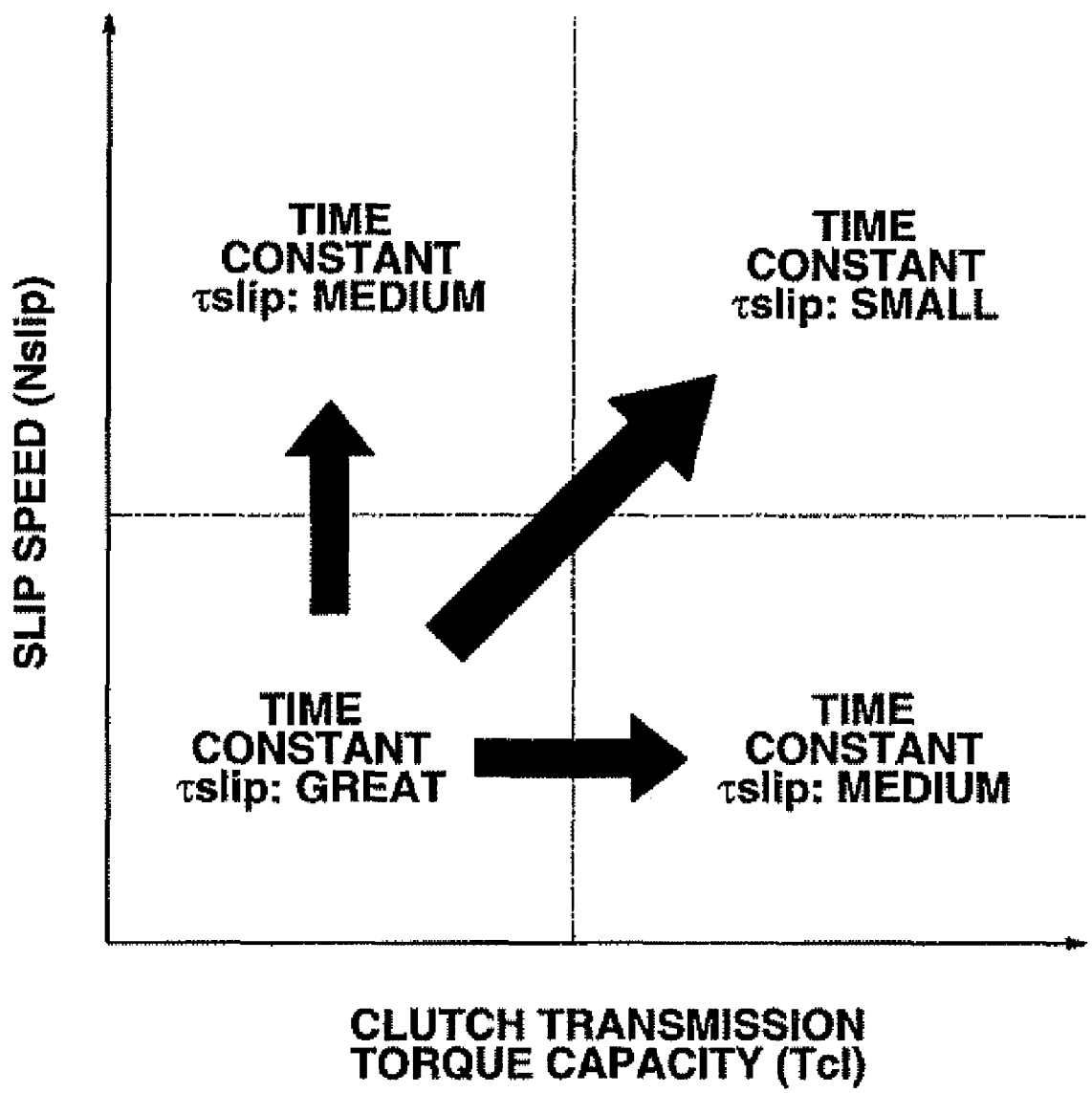
FIG. 5 is a graph used for determining a target clutch slip speed in the clutch engagement control program of FIG. 2.

As shown graphically in FIG. 5, the target slip speed calculation time constant $\tau_{slip}$ of this example is a quantity becoming smaller (faster) as the slip rotational speed Nslip and the transmission torque capacity Tcl of second clutch 7 become greater. This time constant $\tau_{slip}$ becomes smaller when slip rotational speed Nslip increases (as shown by an upward arrow in FIG. 5), or when transmission torque capacity Tcl increases (as shown by a rightward arrow in FIG. 5).

Returning now to FIG. 3, at a step 602, integrated controller 20 calculates a target clutch input (side) speed tNi of the input side of second clutch 7 and a target clutch output (side) speed tNo of the output side of second clutch 7 from the target driving torque tTd determined at S3 and the target slip speed tNslip determined at S601. First, integrated controller 20 determines a target vehicle torque tTo (in terms of an output shaft torque) by calculation of the following equation:

$$tTo = tTd - Tr; \text{ wherein} \quad (2)$$

tTd is the target driving torque tTd; and

Tr is a preliminarily-determined level road vehicle running resistance (which is a function of vehicle speed VSP).

Then, integrated controller 20 determines the target clutch input and output speeds tNi and tNo of second clutch 7 in accordance with this target vehicle torque tTo or an actual vehicle torque To and the following equations:

$$tNi = \{(Gm \cdot Gf)^2/Jo\} \times (tTo/s); \text{ and} \quad (3)$$

$$tNo = Ni - tNslip; \text{ wherein} \quad (4)$$

Jo is the vehicle's moment of inertia Jo;

Gm is the gear ratio based on the selected gear position of the automatic transmission 4;

tNslip is the target slip rotational speed; and

Gf is a final reduction ratio of the final reduction unit 8.

That is, integrated controller 20 determines a desired standard clutch speed represented by the right side of equation (3) by using target vehicle torque tTo and sets target clutch input speed tNi equal to the standard clutch speed as expressed by equation (3). Furthermore, integrated controller 20 determines target clutch output speed tNo from the sensed actual clutch input speed Ni and the target slip speed tNslip determined at S601 according to equation (4). In this case, target clutch input speed tNi is determined directly from the standard clutch speed based on target vehicle torque tTo, and target clutch output speed tNo is determined by subtracting target slip speed tNslip from the actual clutch input speed Ni.

In a second practical example of determining target clutch input and output speeds tNi and tNo by using the actual vehicle torque To, integrated controller 20 employs the following equations:

$$tNi = No + tNslip; \text{ and} \quad (5)$$

$$tNo = \{(Gm \cdot Gf)^2/Jo\} \times (To/s). \quad (6)$$

That is, integrated controller 20 first determines target clutch input speed tNi from the sensed actual clutch output speed No of second clutch 7 and target slip speed tNslip determined at S601 according to equation (5). Furthermore, integrated controller 20 determines a desired standard clutch speed represented by the right side of equation (6) by using the actual vehicle torque To and sets the target clutch output speed tNo equal to the standard clutch speed based on the actual vehicle torque To as expressed by equation (6). In this case, the target clutch output speed tNo is determined directly from the standard clutch speed based on the actual vehicle torque To, and the target clutch input speed tNi is determined by adding target slip speed tNslip to the sensed actual clutch output speed No.

According to another method of determining target clutch input and output speeds tNi and tNo by using actual vehicle torque To, integrated controller 20 can employ, as a third practical example, the following equations:

$$tNo = \{(Gm \cdot Gf)^2/Jo\} \times (To/s); \text{ and} \quad (7)$$

$$tNi = tNo + tNslip. \quad (8)$$

That is, integrated controller 20 determines the desired standard clutch speed represented by the right side of equation (7) by using the actual vehicle torque To and sets target clutch output speed tNo equal to the standard clutch speed based on the actual vehicle torque To as expressed by equation (7). Furthermore, integrated controller 20 determines the target clutch input speed tNi from the target clutch output speed tNo and target slip speed tNslip determined at S601 according equation (8). In this case, the target clutch output speed tNo is determined directly from the standard clutch speed based on the actual vehicle torque To, and the target clutch input speed tNi is determined by adding target slip speed tNslip to the target clutch output speed tNo.

At step S603 integrated controller 20 determines a reference clutch input speed Tiref from the target clutch input speed tTi. In this example, the reference input speed Tiref is calculated by using the flowing recurrence equation obtained by discretization with Tustin approximation:

$$Niref = Gppref(s) \cdot tNi = \{1/(\tau_{ppref} \cdot s + 1)\} tNi; \text{ wherein} \quad (9)$$

$\tau_{ppref}$ is a power source control reference response time constant; and

Gppref is a model of the power source.

At step S604 integrated controller 20 determines a power source output torque correction quantity Tppfb to reduce a clutch input speed deviation Nierr between the reference clutch input speed Tiref and sensed actual clutch input speed Ni of the second clutch 7. In this example, this power source output torque correction quantity Tppfb is calculated by using the following recurrence equation obtained by discretization with Tustin approximation.

$$Tppfb = \{Kppp + (Kppi/s)\} Nierr; \text{ wherein} \quad (10)$$

Kppp is a power source output torque proportional control gain; and

Kppi is a power source output torque integral control gain.

At step S605 integrated controller 20 divides the power source output torque correction quantity Tppfb into an engine torque correction quantity Tefb and a motor torque correction quantity Tmfb in accordance with a vehicle operating condition. It is possible to employ one of various dividing methods of dividing the power source output torque correction quantity Tppfb. However, if the output torque of motor-generator 1 has leeway, the power source output torque Tppfb is divided by setting the engine torque correction quantity Tefb equal to zero and the motor torque correction quantity Tmfb equal to Tppfb such that Tefb=0 and Tmfb=Tppfb. In that case, all of the power source output torque correction quantity Tppfb is allotted to motor torque correction quantity Tmfb.

At step S606 integrated controller 20 calculates a desired base clutch transmission torque capacity tTclbase of second clutch 7 in accordance with a driver's operation and a vehicle running condition. It is possible to set the desired base clutch transmission torque capacity tTclbase equal to the target driving torque tTd determined at step S3 of FIG. 2.

At step S607 integrated controller 20 calculates a desired feedforward control clutch transmission torque capacity Tclff by performing phase compensation on the desired base clutch transmission torque capacity tTclbase by using a feedforward (phase) compensator Gff(s). In this example, this desired feedforward control clutch transmission torque capacity Tclff is calculated by using the flowing recurrence equation obtained by discretization with Tustin approximation:

$$\begin{aligned} Tclff &= Gff(s) \cdot tTclbase \\ &= \{Gclref(s)/Gcl(s)\} \cdot tTclbase \\ &= \{(\tau_{cl} \cdot s + 1)/(\tau_{clref} \cdot s + 1)\} \cdot tTclbase; \text{ wherein} \end{aligned} \quad (11)$$

$\tau_{cl}$ is the clutch's modeling time constant;

$\tau_{clref}$ is the clutch control reference response time constant;

Gclref is a reference model of the clutch; and

Gcl is a model of the clutch.

At step S608 integrated controller 20 inputs the target clutch output speed tNo determined at S602 into a reference model Gclref(s) of second clutch 7 to thereby calculate a reference clutch output speed Noref to conform to the reference model. In this example, this reference clutch output speed Noref is calculated by using the flowing recurrence equation obtained by discretization with Tustin approximation;

$$Noref = Gclref(s) \cdot tNo = \{1/(\tau_{clref} \cdot s + 1)\} \cdot tNo. \quad (12)$$

At step S609 integrated controller 20 calculates a clutch output speed deviation Noerr of the sensed actual clutch output speed No from reference clutch output speed Noref (that is, Noerr=Noref−No) and calculates a clutch transmission torque capacity correction quantity Tclfb, which is a clutch transmission torque capacity feedback control quantity to reduce the clutch output speed deviation Noerr to zero and to make the actual clutch output speed No equal to reference clutch output speed Noref. In this example, the clutch transmission torque capacity correction quantity Tclfb is calculated by using the following recurrence equation obtained by discretization with Tustin approximation:

$$Tclfb = \{Kclp + (Kcli/s)\} \cdot Noerr; \text{ wherein} \quad (13)$$

Kclp is a proportional control gain of the clutch transmission torque capacity; and Kcli is an integral control gain of the clutch transmission torque capacity.

At next step S610 integrated controller 20 further performs target power source output torque calculations. More specifically, integrated controller 20 determines a slip control target clutch transmission torque capacity tTclfbon of second clutch 7 by adding desired feedforward control clutch transmission torque capacity tTclff determined at step S607 and clutch transmission torque capacity correction quantity Tclfb (that is, tTclfbon=tTclff+Tclfb). At this step S610, integrated controller 20 further determines a slip control target engine torque tTefbon of engine 2 and a slip control target motor torque tTmfbon of motor-generator 1 from the desired base engine torque tTebase and desired base motor torque tTmbase determined at step S4 of FIG. 2 and the engine torque correction quantity Tefb and motor torque correction quantity Tmfb determined at step S605 such that tTefbon=tTebase+Tefb and tTmfbon=tTmbase+Tmfb.

Referring again to FIG. 2, when a negative answer is output from decision step S5 of FIG. 2 (indicating not to perform the clutch slip control of second clutch 7), integrated controller 20 proceeds from S5 to step S7 and initializes an integrator used in step S6 (see FIG. 3) without performing the calculation of the slip control target quantity at S6.

The target clutch input speed tNi and target clutch output speed tNo of step S602 are initialized in the following manner. In the case of calculating the target clutch input and output speeds tNi and tNo according to equations (3) and (4), the target clutch input speed tNi is initialized to the actual clutch input speed Ni. In the case of calculating the target clutch input and output speeds tNi and tNo according to equations (5) and (6), the target clutch output speed tNo is initialized to actual clutch output speed No. In the case of calculating the target clutch input and output speeds tNi and tNo according to equations (7) and (8), the target clutch output speed tNo is initialized to actual clutch output speed No.

As to the integrator used in determining the power source output torque correction quantity Tppfb at step S604 and the integrator used in determining the clutch transmission torque capacity correction quantity Tclfb at S609, these integrators are initialized to zero.

At step S8 integrated controller 20 determines a normal control target clutch transmission torque capacity Tclfboff for controlling second clutch 7 to the engaged state or the disengaged state or holding the second clutch 7 in the steady state engaged or disengaged state, or uses the normal control target clutch transmission torque capacity Tclfboff from the steady state engaged or disengaged state for a start of the slip control. Simultaneously, integrated controller 20 determines a normal control target engine torque tTefboff and a normal control target motor torque tTmfboff.

The normal control target clutch transmission torque capacity tTclfboff for controlling second clutch 7 to the engaged state or for holding second clutch 7 in this steady state is set equal to a maximum value that second clutch 7 can achieve. The normal control target clutch transmission torque capacity tTclfboff for controlling second clutch 7 to the disengaged state or for holding second clutch 7 in this steady state is decreased gradually from the current value of the transmission torque capacity of second clutch 7. The normal control target engine torque tTefboff is set equal to the desired base engine torque tTebase determined at step S4, and the normal control target motor torque tTmfboff is set equal to the desired base motor torque tTmbase determined at step S4.

Step S9 is reached from either step S6 or step S8. When the answer to step S5 is "YES" to select the course through S6 to perform the control program of FIG. 3, integrated controller 20 sets the slip control target clutch transmission torque capacity tTclfbon, slip control target engine torque tTefbon and slip control target motor torque tTmfbon determined at step S6, respectively, to a final target clutch transmission torque capacity tTcl, a final target engine torque tTe and a final target motor torque tTm. That is, tTcl=tTclfbon, tTe=tTefbon, and tTm=tTmfbon. At next step S10, integrated controller 20 transmits the final target clutch transmission torque capacity tTcl, final target engine torque tTe and final target motor torque tTm determined at step S9 to clutch controller 26, engine controller 24 and motor-generator controller 25, respectively.

When the answer to step S5 is "NO" to result in selection of the course through steps S7 and S8, step S9 is reached from S8. Hence, integrated controller 20 sets the normal control target clutch transmission torque capacity tTclfboff, normal control target engine torque tTefboff and normal control target motor torque tTmfboff determined at S8, respectively, as the final target clutch transmission torque capacity tTcl, final target engine torque tTe and final target motor torque tTm. That is, tTcl=tTclfboff, tTe=tTefboff, and tTm=tTmfboff. At next step S10, integrated controller 20 transmits the final target clutch transmission torque capacity tTcl, final target engine torque tTe and final target motor torque tTm determined at step S9 to clutch controller 26, engine controller 24 and motor-generator controller 25, respectively.

Figure 6:
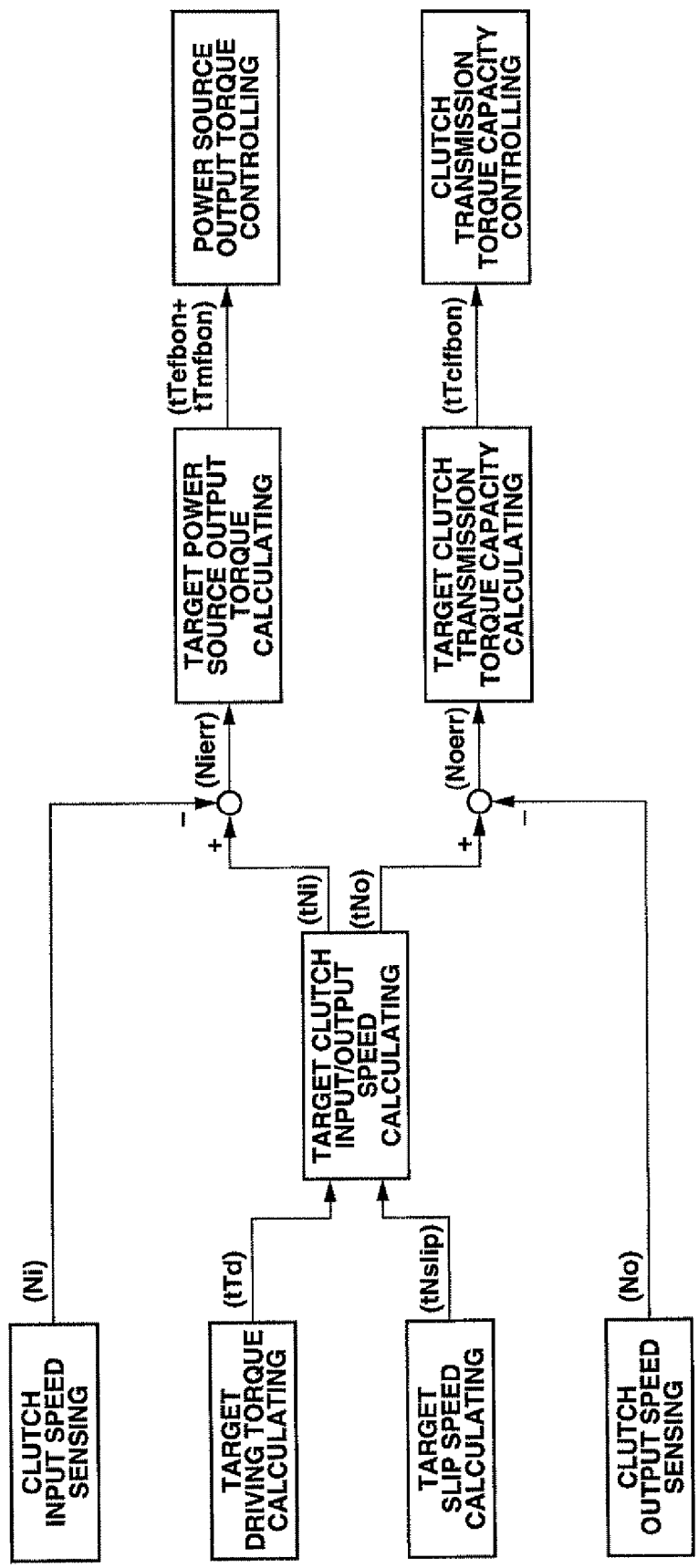
FIG. 6 is a flow chart for illustrating the functions of the control system according to an embodiment.

According to this embodiment, as shown in a block diagram of FIG. 6, the clutch control system comprises: a target driving torque calculating section to calculate a target vehicle driving torque tTd in accordance with a driver's operation and a vehicle running condition; a target slip speed calculating section to calculate a target slip speed tNslip of a clutch such as the second clutch 7 in accordance with the vehicle running condition; and a target clutch input/output speed calculating section to calculate a target clutch input speed tNi of an input side of the clutch for receiving the driving power from the power source wherein the input side is the side located closer to the power source (including motor-generator 1 and engine 2). The target clutch input/output speed calculating section also calculates a target clutch output speed tNo of an output side of the clutch, which is the side closer to the drive wheels 3L, 3R of the vehicle, to deliver the driving power to the drive wheels in accordance with the target driving torque tTd and the target slip speed tNslip.

In addition, the clutch control system comprises a clutch input speed sensing section to sense an actual clutch input speed Ni of the input side of the clutch 7, and a clutch output speed sensing section to sense an actual clutch output speed No of the output side of the clutch 7. A target source output torque calculating section calculate a target power source output torque (tTefbon; tTmfbon) of the power source 1, 2 to reduce a clutch input speed deviation Nierr between the target clutch input speed tNi and the actual clutch input speed Ni. A target clutch transmission torque capacity calculating section calculates a target clutch torque capacity tTclfbon of the clutch 7 to reduce a clutch output speed deviation Noerr between the target clutch output speed tNo and the actual clutch output speed No. The clutch control system also comprises a power source output torque controlling section to control the power source so as to control an actual output torque of the power source 1,2 toward the target power source output torque tTefbon; tTmfbon. Also, a clutch transmission torque capacity controlling section controls the clutch 7 so as to control an actual clutch transmission torque capacity of the clutch 7 toward the target clutch transmission torque capacity tTclfbon.

The thus-constructed control system can provide the following effects. The following explanation is given with reference to FIG. 7, which is an operation time chart of the clutch engagement control by the block diagram of FIG. 6.

In this embodiment, the control system calculates the target clutch input and output speeds tNi and tNo of second clutch 7 from the target vehicle driving torque tTd and target clutch slip speed tNslip. Then, the control system controls the output torque of the power source so as to reduce the clutch input speed deviation Nierr between the target clutch input speed tNi and the sensed actual clutch input speed Ni and controls the transmission torque capacity of the clutch 7 so as to reduce the clutch output speed deviation Noerr between the target clutch output speed tNo and the sensed actual clutch output speed No.

Figure 7:
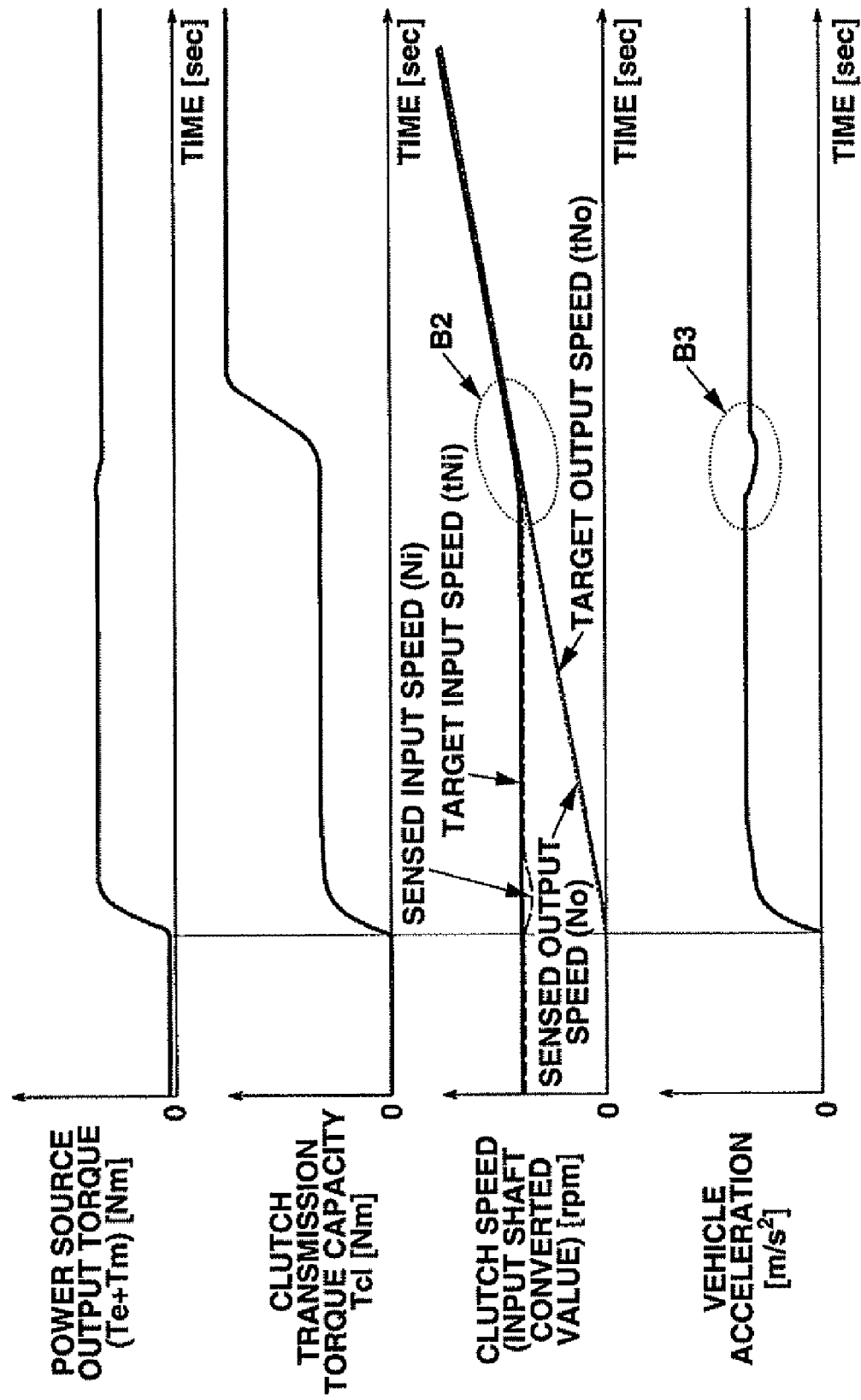
FIG. 7 is a time chart illustrating operations of the clutch engagement control of the control program shown in FIGS. 2 and 3.

With the first feedback control for controlling the power source output torque to reduce the clutch input speed deviation Nierr, the control system can control the clutch input speed Ni with the target clutch input speed tNi even if variation occurs in the power source output torque characteristic or the clutch transmission torque capacity changes abruptly as shown in FIG. 7. Thereby, the control system can prevent abrupt engagement of the clutch 7 as evident from variation of the clutch input speed Ni at a portion B2 and prevent unpleasant change in the vehicle acceleration as evident from variation of the vehicle acceleration at a portion B3.

With the second feedback control for controlling the clutch transmission torque capacity of the clutch 7 to reduce the clutch output speed deviation Noerr between target clutch output speed tNo and actual clutch output speed No, the control system can control the clutch output speed No with the target clutch output speed tNo even if there arises a disturbance due to aging in operating characteristics of the clutch or variation in road gradient. This avoids the problem, as mentioned with reference to FIG. 14 below, of an excessive increase of the clutch slip quantity due to a disturbance that can result in failure in clutch engagement and faster degradation of the clutch by slipping operation for a long time. Consequently, the control system according to this embodiment can always achieve both the desired driving force characteristic and the desired clutch slip control irrespective of condition changes and disturbances.

Figure 14:
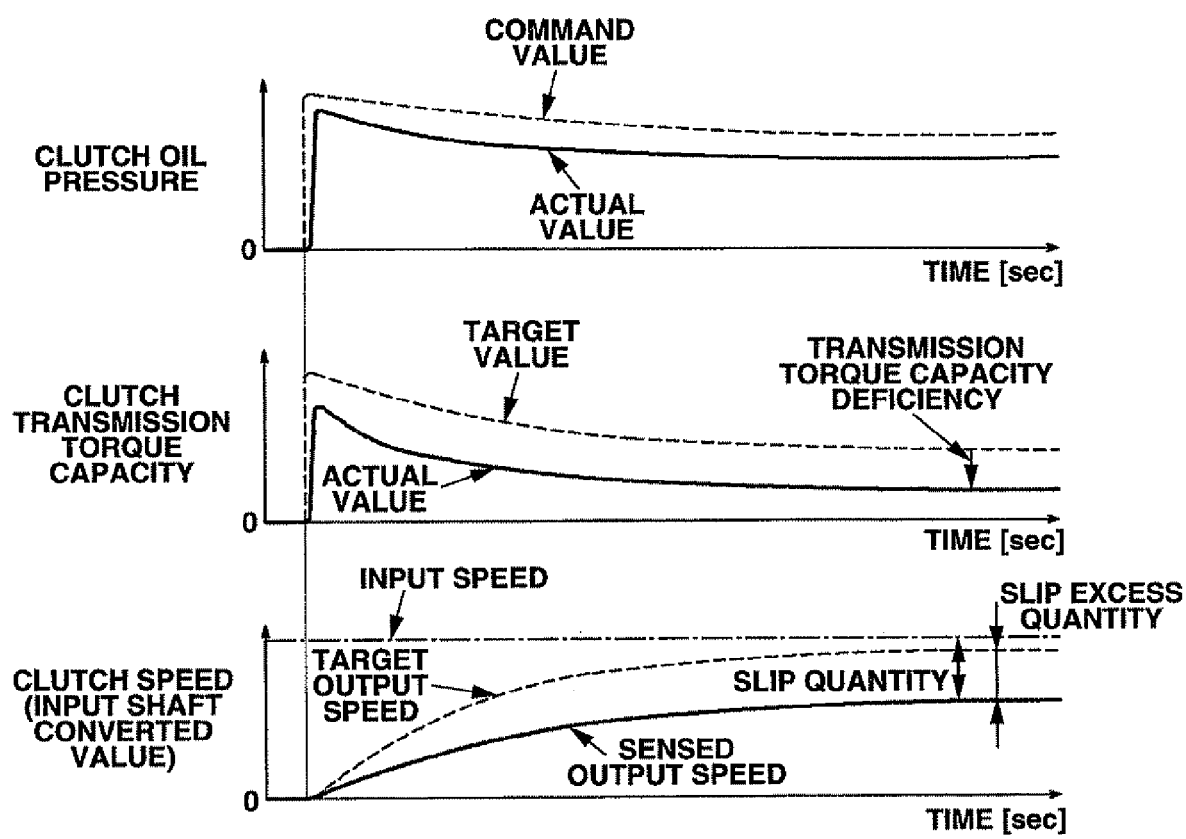
FIG. 14 is a time chart illustrating operations of a clutch engagement control system of a comparative example.

FIGS. 14 and 15 illustrate operations in comparative examples in which the clutch engagement control taught herein is not employed. As shown in FIG. 14, if there arises a disturbance due to a change in the oil temperature or degradation by aging of the clutch, the actual clutch oil pressure shown by a solid line tends to be lower than the command value for the clutch fluid pressure shown by a broken line. Hence, the actual clutch transmission torque capacity of a solid line obtained by the actual clutch pressure is largely deficient as compared to the desired target clutch transmission torque capacity shown by a broken line.

In this case, the actual clutch output speed shown by a solid line becomes significantly lower than the target clutch output speed shown by a broken line. Therefore, the clutch slip quantity represented by the difference between the actual clutch output speed and the clutch input speed shown by a one-dot chain line is increased excessively by a slip excess quantity, which is the difference between the actual clutch output speed of a solid line and the target clutch output speed of a broken line. With this excessive slip quantity, the control system may become unable to engage the clutch properly, and this accelerates the degradation of the clutch by continuation of the slip operation for a long time.

A feedback control system can determine the target transmission torque capacity of the clutch by taking account of the clutch output speed based on the realization that the above-mentioned problem is attributable to the clutch engagement control without regard to the clutch output speed and can control the clutch engagement force in the feedback control mode so as to achieve the thus-determined target transmission torque capacity. However, if a feedforward control is performed with respect to the clutch input speed, there is no guarantee that this system can provide a desired slip rotational speed. Consequently, when the control system increases the clutch transmission torque capacity by increasing the clutch oil pressure to engage the clutch, the clutch input speed might be pulled into the output speed, and the clutch might be engaged abruptly, resulting in a change in acceleration unpleasant to the driver and clutch engagement shock.

This phenomenon is illustrated in FIG. 15 in which the power source output torque (engine torque Te+motor-generator torque Tm) becomes greater, and the clutch is engaged by increasing the clutch transmission torque capacity as shown in FIG. 15.

Because of the feedback control of the clutch engagement force based on the clutch output speed, the sensed actual clutch output speed follows the target output speed closely over the period of the control.

However, when the control system increases the clutch oil pressure to complete the engagement of the clutch from a start of the engagement (slip state), the clutch transmission torque capacity is thereby increased to a maximum value as shown at A1. The actual clutch input speed (i.e., the sensed value) is pulled to the output speed because of the feedforward control of the clutch input speed, the clutch is engaged sharply as shown by a sharp change of the clutch input speed (i.e., the sensed value) at A2. The vehicle acceleration changes unpleasantly as evident from a sharp change shown by hatching at A3.

Figure 8:
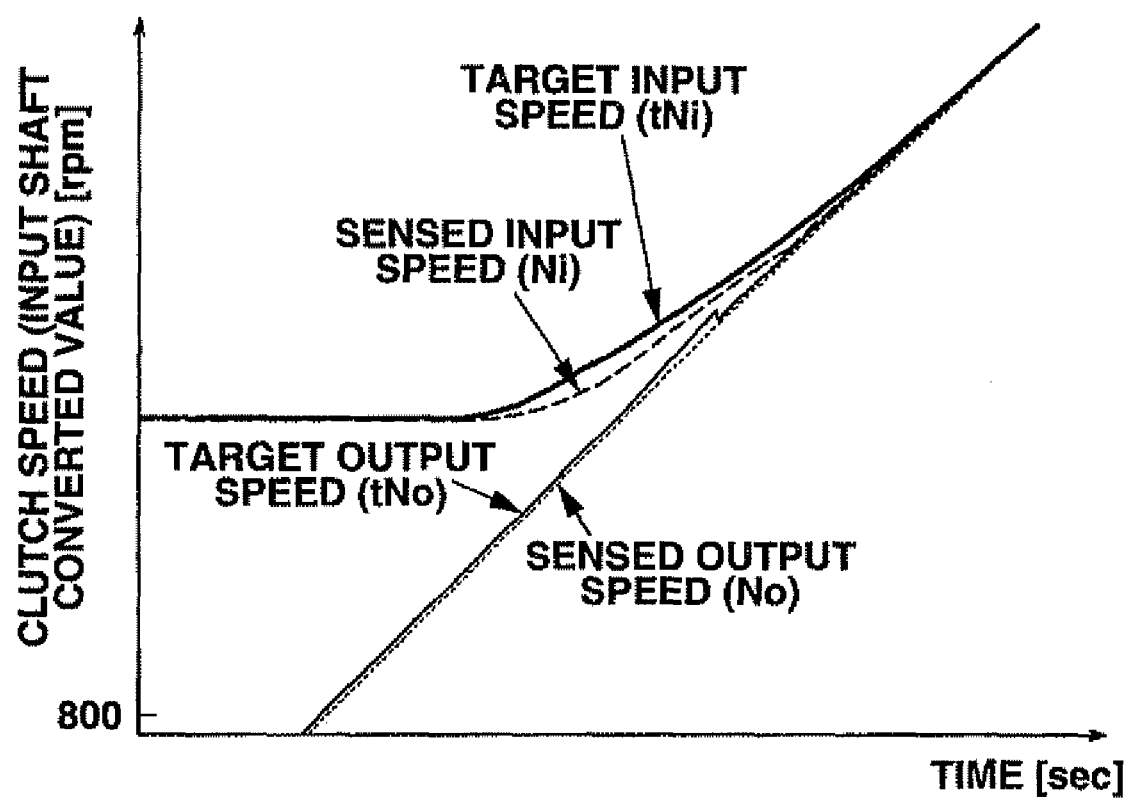
FIG. 8 is an enlarged view of a portion B2 in the time chart of FIG. 7.

In determining target slip speed tNslip of the clutch 7 (at step S601 of FIG. 3), the target slip speed calculating section is preferably configured to vary the target slip speed tNslip gradually to zero or a very small slip speed during a period from a slip state caused by a start of engagement of the clutch 7 to an end of the engagement of the clutch 7. In this case, as evident from an enlarged view of FIG. 8 showing a portion B2 in FIG. 7, the control system can gradually decrease the slip speed, is the difference between input speed Ni and output speed No, even at the time of rapid acceleration and thereby effectively prevent unpleasant change in acceleration.

In determining the target clutch input and output speeds tNi and tNo of the clutch 7 at S602, the target clutch speed calculating section according to this embodiment first calculates the desired standard clutch speed in the slip state of the clutch 7 from target vehicle driving torque tTd by using the right side of the equation (3) or (6) or (7). Then, the target input and output speeds tNi and tNo of the clutch 7 are calculated from this standard clutch speed and the target slip speed tNslip. Therefore, the control system can converge each of the input speed Ni and output speed No of the clutch 7 toward the desired common standard clutch speed and achieve the driving force characteristic as desired by the driver even if the clutch 7 is shifted to the engagement operation.

Figure 9A:
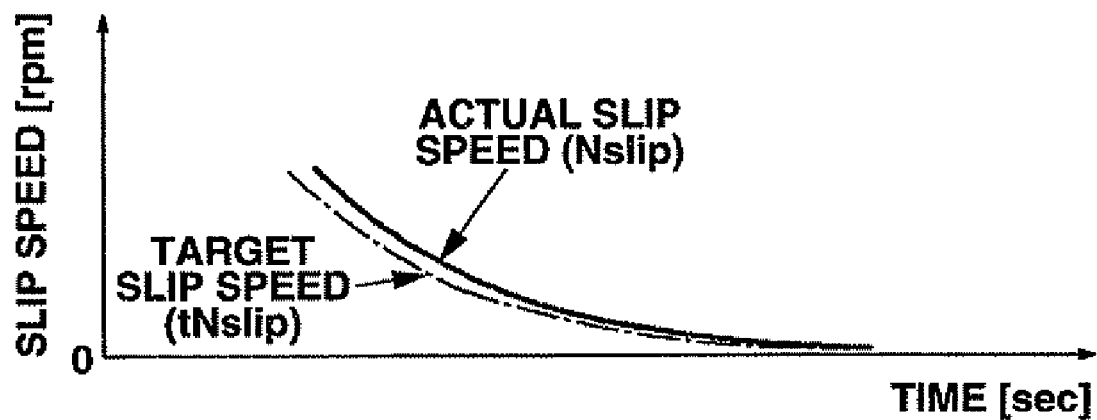
FIGS. 9A and 9B are time series variation time charts of the clutch slip speed and the clutch input and output speeds when the target clutch input and output speeds are determined in a first practical example.
Figure 9B:
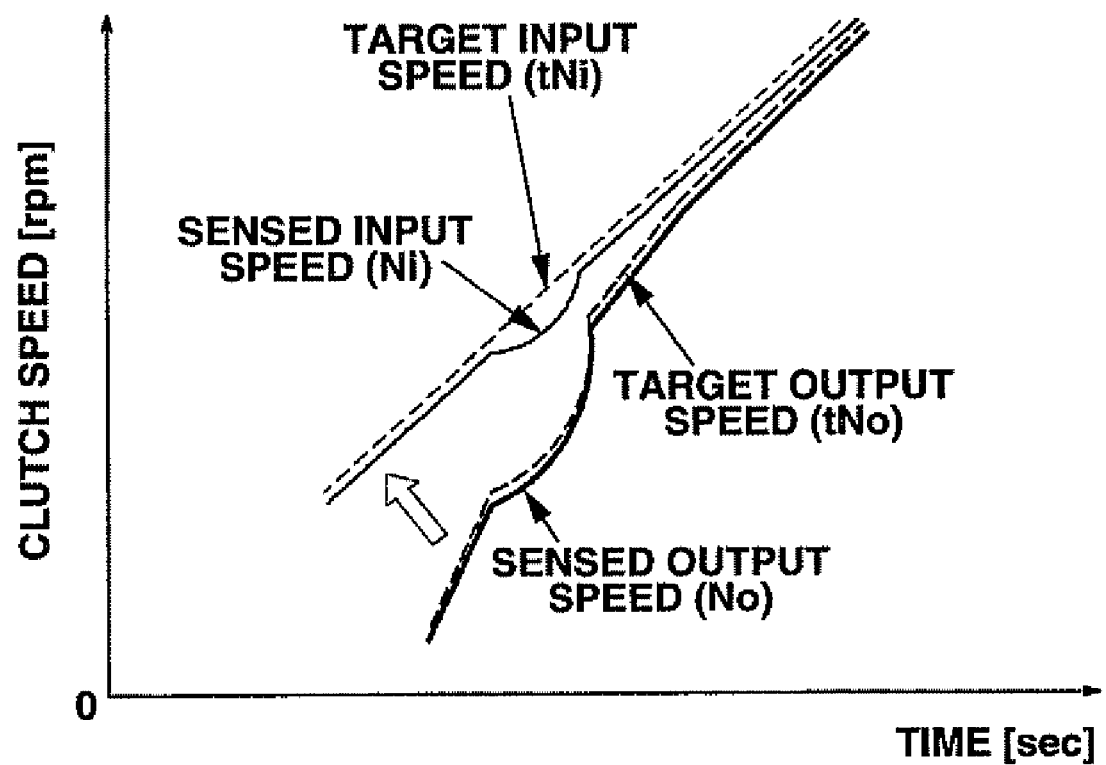

In determining the target clutch input and output speeds tNi and tNo of the clutch 7 at step S602, the target clutch speed calculating section according to this embodiment sets the target input speed tNi of the clutch 7 equal to the standard clutch speed calculated by equation (3) based on target vehicle driving torque tTd. The target clutch speed calculating section further calculates the target clutch output speed tNo by subtracting the target slip speed tNslip from the actual input speed Ni of the clutch 7 according to equation (4). Therefore, by performing slip speed control by controlling the transmission torque capacity of the clutch 7, the control system according to this embodiment can control the clutch output speed No so that the clutch output speed No gradually approaches the input speed Ni as shown in FIGS. 9A and 9B. Especially when the control accuracy of the transmission torque capacity of the clutch 7 is higher than the accuracy of the torque control of the power source, 1, 2, the control system can control the slip condition of the clutch 7 more accurately.

Figure 10A:
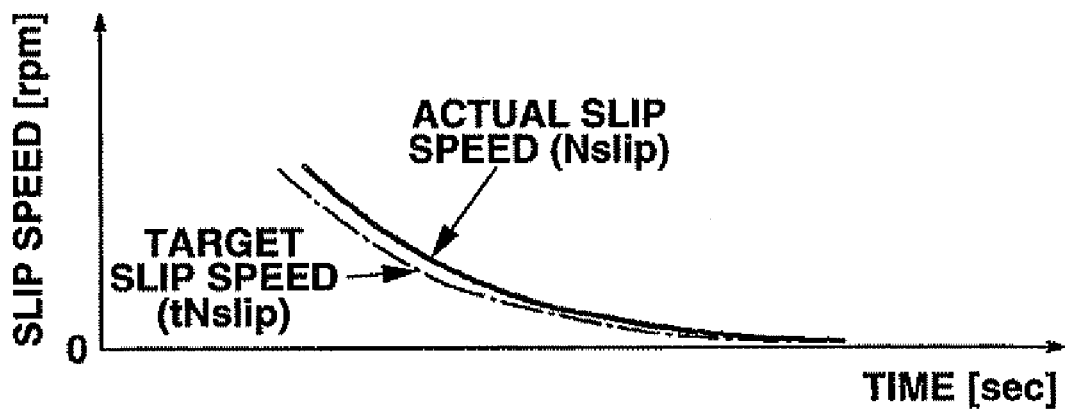
FIGS. 10A and 10B are time series variation time charts of the clutch slip speed and the clutch input and output speeds when the target clutch input and output speeds are determined in a second practical example.
Figure 10B:
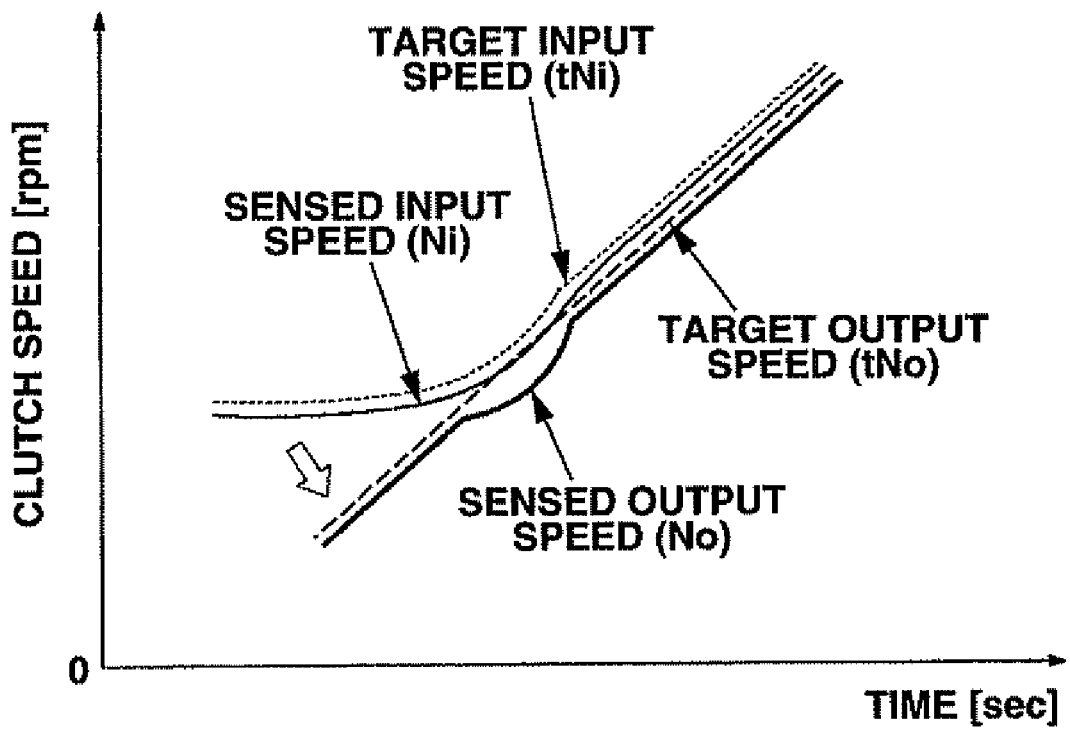

In determining the target clutch input and output speeds tNi and tNo of the clutch 7 at step S602, the target clutch speed calculating section according to this embodiment can set the target output speed tNo of the clutch 7 equal to the standard clutch speed calculated by equation (6) based on target vehicle driving torque tTd. The target input speed tNi is calculated by adding the target slip speed tNslip to the actual output speed No of the clutch 7 according to equation (5). Therefore, by performing slip speed control with the control of the power source output torque, the control system according to this embodiment can control the clutch input speed Ni so that the clutch input speed Ni gradually approaches the output speed No, as shown in FIGS. 10A and 10B. Especially when the control accuracy of the power source output torque control is higher than the accuracy of the clutch transmission torque capacity control, the control system can control the slip condition of clutch 7 more accurately.

Figure 11A:
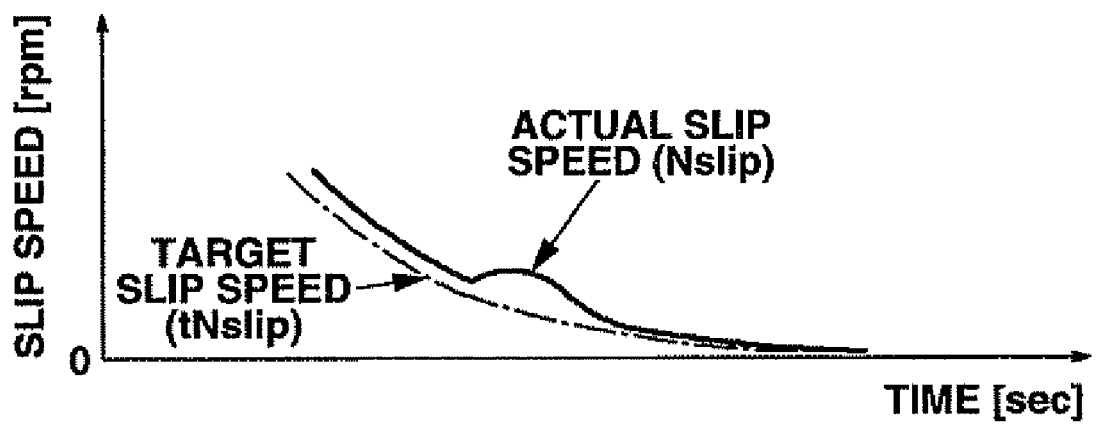
FIGS. 11A and 11B are time series variation time charts of the clutch slip speed and the clutch input and output speeds when the target clutch input and output speeds are determined in a third practical example.
Figure 11B:
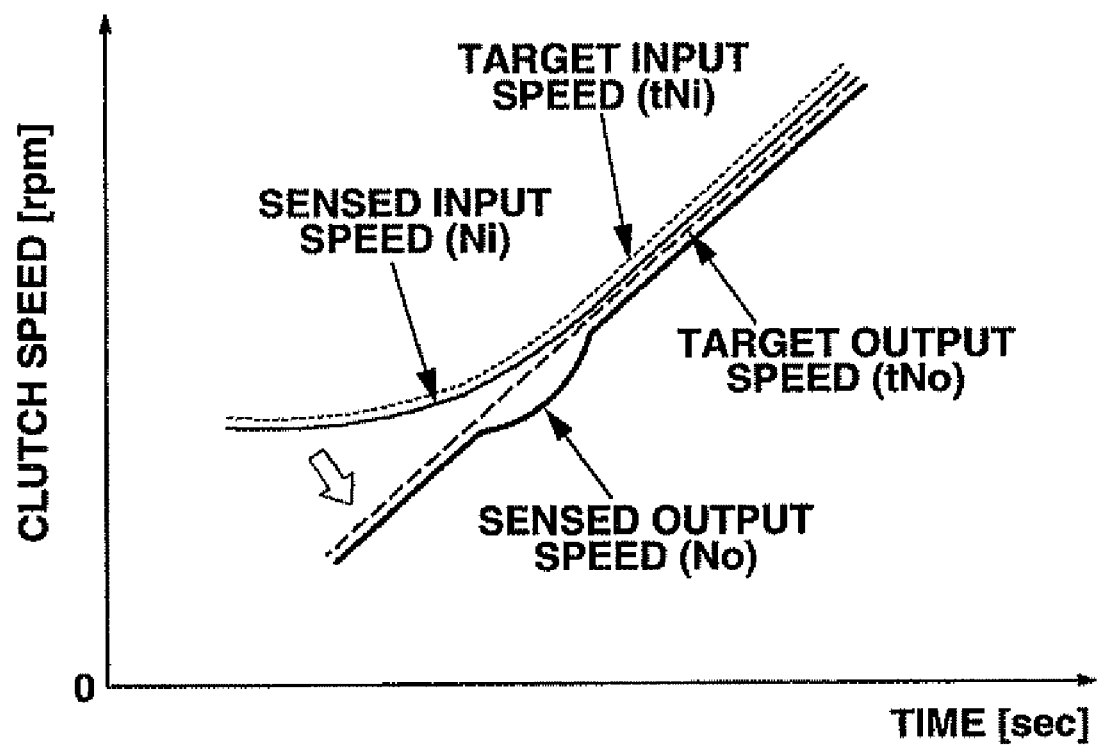

In determining the target clutch input and output speeds tNi and tNo of the clutch 7 at step S602, the target clutch speed calculating section according to this embodiment can set the target output speed tNo of the clutch 7 equal to the standard clutch speed calculated by equation (7) based on target driving torque tTd. The target input speed tNi is calculated by adding the target slip speed tNslip to the target output speed tNo of the clutch 7 according to equation (8). Therefore, by performing slip speed control with the control of the power source output torque, the control system can control the clutch input speed Ni so that the clutch input speed Ni gradually approaches the output speed No, as shown in FIGS. 11A and 11B. Especially when the control accuracy of the power source output torque control is higher than the accuracy of the clutch transmission torque capacity control, the control system can control the slip condition of clutch 7 more accurately and control the input speed (the engine speed and motor-generator speed) smoothly without causing unnatural feeling to the driver.

In determining the target slip speed tNslip of the clutch 7 at step S601, the target slip speed calculating section according to this embodiment initializes the target slip speed to the sensed actual clutch slip speed at the time of a start of engagement of the clutch 7 at which the clutch 7 is put to the slip state. Then, the target slip speed calculating section applies a predetermined transfer function (a delay) determined by the time constant τslip to the target slip speed. Therefore, the control system can vary the target slip speed tNslip gradually and smoothly to zero or a very small value and reflect intentions of the designer of the system readily on the slip control of the clutch 7 by adjusting the transfer function (delay) determined by the time constant τslip.

The transfer function determined by the time constant τslip is preferably a transfer function that becomes smaller (faster) as the slip speed Nslip and the transmission torque capacity Tcl of the clutch (7) increase as shown by example in FIG. 5. In this case, the control system can prevent faster degradation of the clutch 7 by increasing the speed of engagement of the clutch 7 when the slip speed Nslip and the clutch transmission torque capacity Tcl are high and the amount of heat generation in the clutch 7 is increased.

In determining the target input speed tNi and target output speed tNo at step S602, the target clutch speed calculating section may be configured to determine these target clutch input and output speeds by using the following method instead of using equations (3)-(8). Namely, in accordance with the target vehicle torque tTo determined by equation (2) or the actual vehicle torque To, the vehicle moment of inertia Jo, the gear ratio Gm determined by the selected gear position of automatic transmission 4, the final reduction ratio Gf of final reduction gear unit 8, a clutch input speed control reference transfer function Giref(s) and a clutch output speed control reference transfer function Goref(s), the integrated controller 20 determines target input and output speeds tNi and tNo of second clutch 7 in the following manner.

In determining target input speed tNi and target output speed tNo, the integrated controller 20 sets the input side of second clutch 7 as a reference side used as a reference for the clutch speed and calculates the target clutch input speed of second clutch 7 as a desired reference clutch speed. Moreover, integrated controller 20 sets the output side of second clutch 7 as a control side to achieve the target slip speed and calculates the target clutch output speed of second clutch 7 as a desired non-reference clutch speed. Therefore, the control system can make the clutch output speed No so as to approach the clutch input speed Ni gradually, as shown by example in FIGS. 9A and 9B, with the clutch transmission torque capacity control of second clutch 7. Especially when the control accuracy of the clutch transmission torque capacity control is higher than the accuracy of the power source torque control, the control system can control the slip condition of second clutch 7 more accurately.

Target clutch input and output speeds tNi and tNo of second clutch 7 can be determined from target vehicle torque tTo in the following manner as a third practical example. Integrated controller 20 sets the target clutch input speed tNi equal to the desired standard clutch speed represented by the right side of the following equation:

$$tNi = \{(Gm \cdot Gf)^2 / Jo\} \times (tTo/s). \tag{3}$$

That is, integrated controller 20 determines the desired standard clutch speed represented by the right side of equation (3) by using target vehicle torque tTo and sets target clutch input speed tNi equal to the standard clutch speed as expressed by equation (3). Furthermore, integrated controller 20 determines the target clutch output speed (the desired non-reference clutch speed) according to the following equation:

$$tNo = \{Giref(s)/Goref(s)\} \times tNi - tNslip - \{Giref(s) \cdot tNi - Ni\}. \tag{14}$$

That is, target clutch output speed tNo on the non-reference side of second clutch 7 is determined from a quantity $\{Giref(s)/Goref(s)\} \times tNi$ that is obtained by performing, on the desired standard clutch speed (target clutch input speed tNi), a phase advance with a phase compensator composed of a transfer function on the input (reference) side of second clutch 7 and the inverse system of a transfer function on the output (non reference) side of second clutch 7, the target slip speed tNslip and a difference $\{Giref(s) \cdot tNi - Ni\}$ between the sensed clutch speed Ni on the input (reference) side of second clutch 7 and the reference clutch speed of the input side of second clutch 7.

When target clutch input and output speeds tNi and tNo of second clutch 7 are determined from actual vehicle torque To, integrated controller 20 sets the target clutch output speed tNo equal to the desired standard clutch speed represented by the right side of the following equation:

$$tNo = \{(Gm \cdot Gf)^2 / Jo\} \times (To/s). \tag{6}$$

That is, the integrated controller 20 determines the desired standard clutch speed represented by the right side of equation (6) by using actual vehicle torque To and sets target clutch output speed tNo equal to the standard clutch speed as expressed by equation (6). Furthermore, integrated controller 20 determines the target clutch input speed (the desired non-reference clutch speed) according to the following equation:

$$tNi = \{Goref(s)/Giref(s)\} \times tNo + tNslip - \{Goref(s) \cdot tNo - No\}. \tag{15}$$

That is, target clutch input speed tNi is determined from a quantity $\{Goref(s)/Giref(s)\} \times tNo$ that is obtained by performing, on the desired standard clutch speed (target clutch output speed tNo), a phase advance with a phase compensator composed of a transfer function on the output (reference) side of second clutch 7 and the inverse system of a transfer function on the input (non reference) side of second clutch 7, the target slip speed tNslip and a difference $\{Goref(s) \cdot tNo - No\}$ between the sensed clutch speed No on the output (reference) side of second clutch 7 and the reference clutch speed of the output side of second clutch 7.

In determining target clutch input and output speeds tNi and tNo, the integrated controller 20 sets the output side of second clutch 7 as the reference side for the clutch speed and calculates the target clutch output speed of the output side of second clutch 7 as the desired reference clutch speed. Moreover, integrated controller 20 sets the input side of second clutch 7 as the control side to achieve the target slip speed and calculates the target clutch input speed of the input side of second clutch 7 as the desired non-reference clutch speed. Therefore, the control system can make the clutch input speed Ni so as to approach the clutch output speed No gradually as shown by example in FIGS. 10A and 10B with the slip speed control by the power source output torque control. Especially when the control accuracy of the power source output torque control is higher than the accuracy of the clutch transmission torque capacity control of second clutch 7, the control system can control the slip condition of second clutch 7 more accurately.

In the above-mentioned two practical examples, the control system calculates the desired non-reference clutch speed of the non-reference side of second clutch 7 from the quantity that is obtained by performing, on the desired standard clutch speed, the phase advance with the phase compensator composed of the transfer function on the reference side of second clutch 7, and the inverse system of the transfer function on the non-reference side of second clutch 7, the target slip speed, and the difference between the sensed clutch reference speed of the reference side of second clutch 7 and the desired reference clutch speed of second clutch 7. Therefore, the control system can provide the following effects and advantages.

Figure 12:
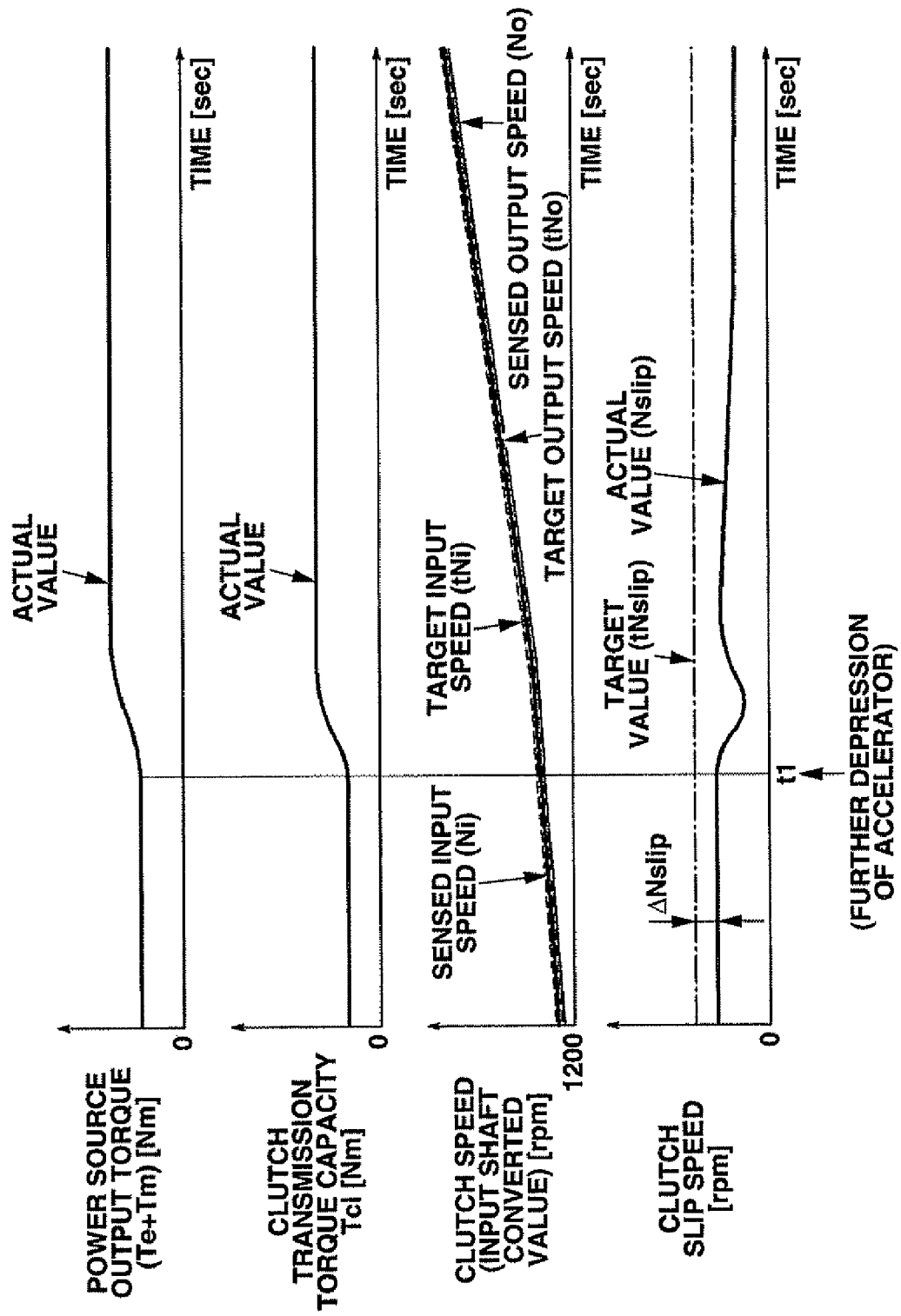
FIG. 12 is a time chart illustrating a steady state error appearing in the clutch slip speed when the target clutch input and output speeds are determined in the first, second or third example.
Figure 13:
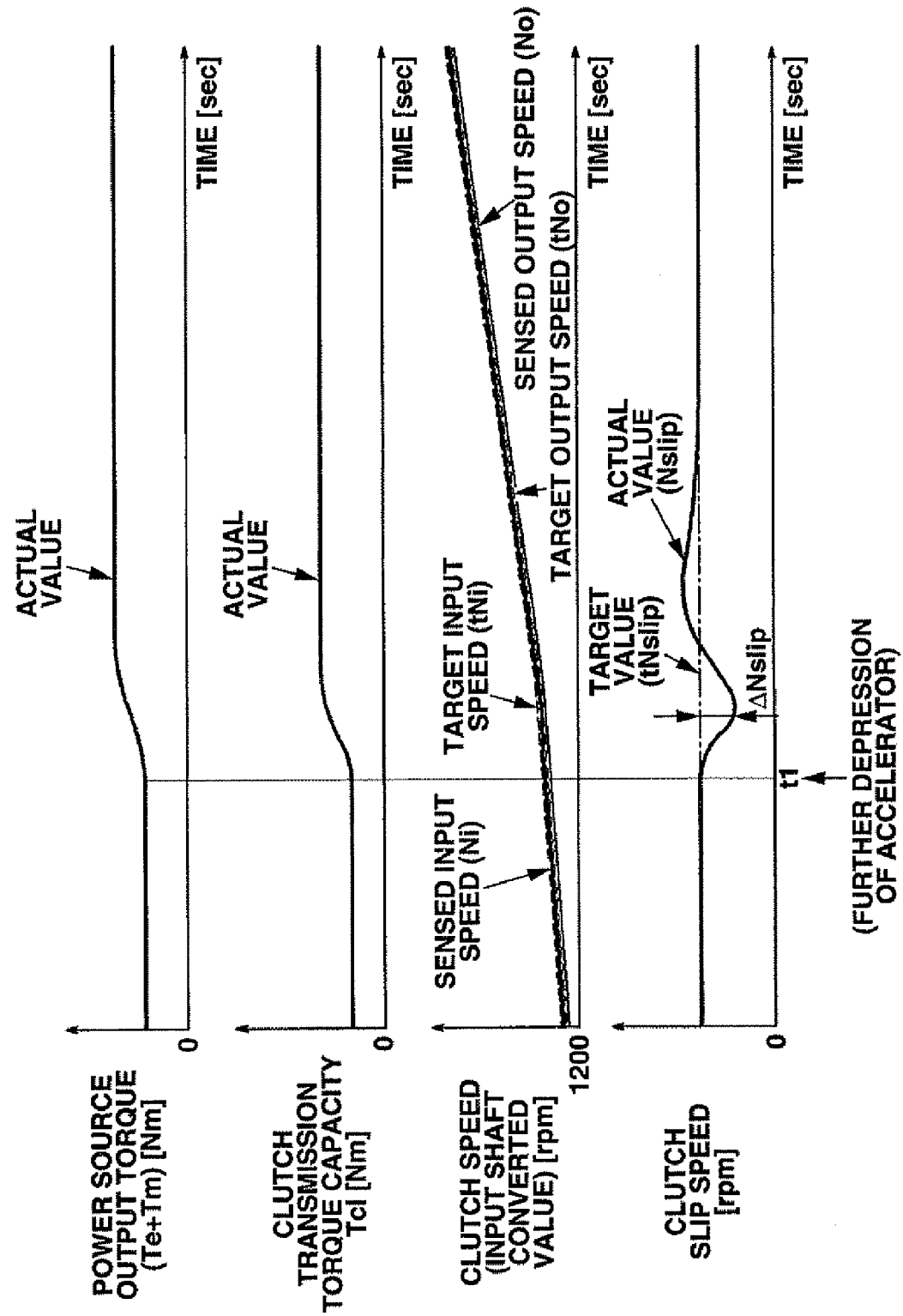
FIG. 13 is a time chart illustrating variation of the clutch slip speed free from the steady state error when the target clutch input and output speeds are determined in a fourth practical example.

When the target clutch input and output speeds tNi and tNo are determined, as in the examples of equations (3)-(8), without taking account of the transfer functions (control response delay) of the input and output sides of second clutch 7, there arises an undesired steady state error ΔNslip of the slip speed as shown in FIG. 12. Besides, the undesired steady state error ΔNslip of the slip speed increases each time the vehicle acceleration is increased, as shown in FIG. 12, by an increasing tendency of steady state error ΔNslip after a time point t1 at which the accelerator pedal is depressed. In contrast to this, by determining the target clutch input and output speeds tNi and tNo as in the above-mentioned two practical examples, the control system subjects the desired clutch reference speed to the phase advance with the phase compensator composed of the transfer function on the reference side of second clutch 7 and the inverse system of the transfer function on the non-reference side of second clutch 7. Therefore, even if the slip speed error ΔNslip is temporarily increased after an increase of the acceleration at a time point t1 as shown in FIG. 13, the control system can reduce the slip speed error ΔNslip to zero promptly and avoid the problem of the steady state error being increased by each increase of the acceleration.

Furthermore, since the second clutch 7 is controlled in consideration of the control error of the standard clutch speed, the control system can control the slip speed as intended and achieve the intended purpose even if the standard clutch speed is away from the target.

In addition, the control apparatus can vary the clutch input speed without being influenced even if there arises a variation in the output torque characteristic of the power sources and an abrupt change in the clutch transmission torque capacity. Thereby, the control apparatus solves the problem of unpleasant acceleration variation.

Also, the control apparatus can vary the clutch output speed without being influenced even if there arises a disturbance due to variation with time of the clutch operating characteristic or a change in the road gradient to thereby solve the problem that the system becomes unable to engage the clutch because of an excessive increase of the clutch slip quantity by the disturbance, causing acceleration of the degradation of the clutch by continuation of the slip operation for a long time. Consequently, the control system taught herein can always achieve both the desired driving force characteristic and the desired clutch slip speed control irrespective of changes in situation and disturbance.

Also, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A clutch engagement control apparatus for a hybrid vehicle, comprising:
   power sources;
   a clutch disposed between power sources and drive wheels and arranged to vary a transmission torque capacity;
   a clutch input speed sensing device to sense an actual clutch input speed of an input side of the clutch;
   a clutch output speed sensing device to sense an actual clutch output speed of an output side of the clutch; and
   a controller configured to:
      calculate a target vehicle driving torque in accordance with a driver's operation and a vehicle running condition;
      calculate a target clutch slip speed of the clutch in accordance with a vehicle running condition;
      calculate a target clutch input speed of the input side of the clutch and a target clutch output speed of the output side of the clutch in accordance with the target vehicle driving torque and the target clutch slip speed;
      calculate a target power source output torque of the power sources to reduce a clutch input speed deviation between the target clutch input speed and the actual clutch input speed;
      calculate a target clutch transmission torque capacity of the clutch to reduce a clutch output speed deviation between the target clutch output speed and the actual clutch output speed;
      control the power sources so as to control an actual power source output torque of the power sources toward the target power source output torque; and
      control the clutch so as to control an actual clutch transmission torque capacity of the clutch toward the target clutch transmission torque capacity.

2. The apparatus according to claim 1 wherein the controller is further configured to:
   calculate the target clutch slip speed so as to vary the target clutch slip speed gradually to zero or close to zero during a period from a slip state caused by a start of engagement of the clutch to an end of the engagement of the clutch.

3. The apparatus according to claim 1 wherein the controller is further configured to:
   calculate a standard clutch speed used as a standard in a slip state of the clutch from the target vehicle driving torque; and
   calculate the target clutch input and output speeds using the standard clutch speed.

4. The apparatus according to claim 3 wherein the controller is further configured to:
   calculate the target clutch input speed of the clutch from the standard clutch speed; and calculate the target output speed by subtracting the target slip speed from the actual clutch input speed of the clutch.

5. The apparatus according to claim 3 wherein the controller is further configured to:
calculate the target output speed of the clutch from the standard clutch speed; and
calculate the target input speed by adding the target clutch slip speed to the actual clutch output speed of the clutch.

6. The apparatus according to claim 3 wherein the controller is further configured to:
calculate the target output speed of the clutch from the standard clutch speed; and
calculate the target input speed by adding the target clutch slip speed to the target clutch output speed of the clutch.

7. The apparatus according to claim 3 wherein the controller is further configured to:
initialize the target clutch slip speed to an actual clutch slip speed at the time of a start of engagement of the clutch at which the clutch is put to a slip state; and
apply a predetermined transfer function to the target clutch slip speed.

8. The apparatus according to claim 7 wherein the transfer function applied to the target clutch slip speed is a transfer function that becomes faster as a slip speed and the transmission torque capacity of the clutch increase.

9. The apparatus according to claim 3 wherein the controller is further configured to:
set the input side of the clutch as a reference side;
calculate the target clutch input speed as a reference clutch speed;
set the output side of the clutch as a control side to be controlled so as to achieve the target clutch slip speed; and
calculate the target clutch output speed as a non-reference clutch speed.

10. The apparatus according to claim 3 wherein the controller is further configured to:
set the output side of the clutch as a reference side;
calculate the target clutch output speed as a reference clutch speed;
set the input side of the clutch as a control side to be controlled so as to achieve the target clutch slip speed; and
calculate the target clutch input speed as a non-reference clutch speed.

11. A clutch engagement control apparatus for a hybrid vehicle including power sources, a drive wheel and a clutch disposed between power sources and a drive wheel, the clutch arranged to vary a transmission torque capacity, the apparatus comprising:
means for calculating a target vehicle driving torque in accordance with a driver's operation and a vehicle running condition;
means for calculating a target clutch slip speed of the clutch in accordance with a vehicle running condition;
means for calculating a target clutch input speed of an input side of the clutch and a target clutch output speed of an output side of the clutch in accordance with the target vehicle driving torque and the target clutch slip speed;
means for calculating a target power source output torque of the power sources to reduce a clutch input speed deviation between the target clutch input speed and an actual clutch input speed of the clutch;
means for calculating a target clutch transmission torque capacity of the clutch to reduce a clutch output speed deviation between the target clutch output speed and an actual clutch output speed of the clutch;
means for controlling the power sources so as to control an actual power source output torque of the power sources toward the target power source output torque; and
means for controlling the clutch so as to control an actual clutch transmission torque capacity of the clutch toward the target clutch transmission torque capacity.

12. A clutch engagement control method for a hybrid vehicle including power sources, a drive wheel and a clutch disposed between power sources and a drive wheel, the clutch arranged to vary a transmission torque capacity, the method comprising:
calculating a target vehicle driving torque in accordance with a driver's operation and a vehicle running condition;
calculating a target clutch slip speed of the clutch in accordance with a vehicle running condition;
calculating a target clutch input speed of an input side of the clutch and a target clutch output speed of an output side of the clutch in accordance with the target vehicle driving torque and the target clutch slip speed;
calculating a target power source output torque of the power sources to reduce a clutch input speed deviation between the target clutch input speed and an actual clutch input speed of the input side of the clutch;
calculating a target clutch transmission torque capacity of the clutch to reduce a clutch output speed deviation between the target clutch output speed and an actual clutch output speed of the output side of the clutch;
controlling the power sources so as to control an actual power source output torque of the power sources toward the target power source output torque; and
controlling the clutch so as to control an actual clutch transmission torque capacity of the clutch toward the target clutch transmission torque capacity.

13. The process according to claim 12 wherein calculating the target clutch slip speed further comprises:
varying the target clutch slip speed gradually to a small slip speed approaching zero during a period from a slip state caused by a start of engagement of the clutch to an end of the engagement of the clutch.

14. The process according to claim 12, further comprising:
calculating a standard clutch speed used as a standard in a slip state of the clutch, from the target vehicle driving torque; and
calculating the target clutch input and output speeds using the standard clutch speed.

15. The process according to claim 14 wherein calculating the target clutch input and output speeds using the standard clutch speed further comprises:
calculating the target clutch input speed from the standard clutch speed; and
calculating the target clutch output speed by subtracting the target slip speed from the actual clutch input speed.

16. The process according to claim 14 wherein calculating the target clutch input and output speeds using the standard clutch speed further comprises:
calculating the target clutch output speed from the standard clutch speed; and
calculating the target clutch input speed by adding the target clutch slip speed to the actual clutch output speed.

17. The process according to claim 14 wherein calculating the target clutch input and output speeds using the standard clutch speed further comprises:
calculating the target clutch output speed from the standard clutch speed; and calculating the target clutch input speed by adding the target clutch slip speed to the target clutch output speed.

18. The process according to claim 14, further comprising:

initializing the target clutch slip speed to an actual clutch slip speed at the time of a start of engagement of the clutch at which time the clutch is put to a slip state; and applying a predetermined transfer function to the target clutch slip speed.

19. The process according to claim 18 wherein the transfer function applied to the target clutch slip speed is a transfer function that becomes faster as a slip speed of the clutch and the transmission torque capacity of the clutch increase.

20. The process according to claim 14, further comprising:

setting the input side of the clutch as a reference side;

calculating the target clutch input speed as a reference clutch speed;

setting the output side of the clutch as a control side to be controlled for achieving the target clutch slip speed; and calculating the target clutch speed as a non-reference clutch speed.

21. The process according to claim 14, further comprising:

setting the output side of the clutch as a reference side;

calculating the target clutch output speed as a reference clutch speed;

setting the input side of the clutch as a control side to be controlled for achieving the target clutch slip speed; and calculating the target clutch input speed as a non-reference clutch speed.

* * * * *